United States Patent
Bhosale et al.

(10) Patent No.: US 11,162,706 B2
(45) Date of Patent: Nov. 2, 2021

(54) SYSTEMS AND METHODS FOR ENERGY RECOVERY OF AN HVAC SYSTEM

(71) Applicant: Johnson Controls Technology Company, Auburn Hills, MI (US)

(72) Inventors: Anil V. Bhosale, Taluka Karad (IN); Appiya B. Suriya Prakash, Pune (IN); Neelkanth S. Gupte, Katy, TX (US); Vinay Nanjappa, Bangalore (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 286 days.

(21) Appl. No.: 16/136,034

(22) Filed: Sep. 19, 2018

(65) Prior Publication Data

US 2020/0088439 A1 Mar. 19, 2020

Related U.S. Application Data

(60) Provisional application No. 62/732,958, filed on Sep. 18, 2018.

(51) Int. Cl.
*F24F 12/00* (2006.01)
*F24F 13/02* (2006.01)
(Continued)

(52) U.S. Cl.
CPC .......... *F24F 12/006* (2013.01); *F24F 5/0035* (2013.01); *F24F 13/02* (2013.01); *F24F 13/08* (2013.01); *F24F 2011/0002* (2013.01)

(58) Field of Classification Search
CPC .......... F24F 11/74; F24F 12/00; F24F 12/001; F24F 12/006; F24F 13/02; F24F 13/04;
(Continued)

(56) References Cited

U.S. PATENT DOCUMENTS 5,971,067 A * 10/1999 Rayburn .................. F24F 11/30
165/217
6,176,305 B1 * 1/2001 Haglid .................. F24F 5/0035
165/231

(Continued)

OTHER PUBLICATIONS

David H. Mudarri, Building Codes and Indoor Air Quality, Sep. 2010, U.S. Environmental Protection Agency, https://www.epa.gov/sites/production/files/2014-08/documents/building_codes_and_iaq.pdf (Year: 2010).*

(Continued)

*Primary Examiner* — Larry L Furdge
*Assistant Examiner* — Chang H Park
(74) *Attorney, Agent, or Firm* — Fletcher Yoder, P.C.

(57) ABSTRACT

The present disclosure relates to a heating, ventilation, and/or air conditioning (HVAC) system including an exhaust plenum configured to receive an exhaust air flow from a cooling load. The HVAC system also includes a condenser configured to receive an input air flow and transfer thermal energy to the input air flow. A panel is positioned directly adjacent to and between the exhaust plenum and the condenser. The panel includes a passage providing a fluid flow path directly between the exhaust plenum and the condenser. The passage is configured to discharge a portion of the exhaust air flow, and the input air flow includes the portion.

26 Claims, 12 Drawing Sheets

(51) Int. Cl.
*F24F 13/08* (2006.01)
*F24F 5/00* (2006.01)
*F24F 11/00* (2018.01)

(58) Field of Classification Search
CPC .... F24F 13/08; F24F 13/10; F24F 2011/0002; F24F 2011/0006; F24F 7/06; F24F 3/044; F24F 5/0035
See application file for complete search history.

(56) References Cited

U.S. PATENT DOCUMENTS

| | | | |
|---|---|---|---|
| 6,574,975 B2 * | 6/2003 | Bourne | F24F 5/0035 62/171 |
| 6,749,125 B1 * | 6/2004 | Carson | F24F 7/08 165/248 |
| 7,322,205 B2 | 1/2008 | Bourne et al. | |
| 9,353,966 B2 * | 5/2016 | Finkam | F24F 12/001 |
| 9,832,911 B2 | 11/2017 | Cotton et al. | |
| 2005/0056042 A1 | 3/2005 | Bourne et al. | |
| 2015/0369527 A1 | 12/2015 | Ghadiri Moghaddam et al. | |

OTHER PUBLICATIONS

Trane, Indoor Air Quality, A Guide to Understanding AHRAE Standard 62-2001, Feb. 2002, The Trane Company (Year: 2002).*

* cited by examiner

SYSTEMS AND METHODS FOR ENERGY RECOVERY OF AN HVAC SYSTEM

CROSS-REFERENCE TO RELATED APPLICATIONS

This application claims priority from and the benefit of U.S. Provisional Application Ser. No. 62/732,958, entitled "SYSTEMS AND METHODS FOR ENERGY RECOVERY OF AN HVAC SYSTEM", filed Sep. 18, 2018, which is herein incorporated by reference in its entirety for all purposes.

BACKGROUND

This disclosure relates generally to heating, ventilation, and air conditioning (HVAC) systems. Specifically, the present disclosure relates to an energy recovery system for HVAC units.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as an admission of any kind.

A heating, ventilation, and air conditioning (HVAC) system may be used to thermally regulate an environment, such as a building, home, or other structure. The HVAC system may include a vapor compression system, which includes heat exchangers such as a condenser and an evaporator, which transfer thermal energy between the HVAC system and the environment. In many cases, the HVAC system may be used to direct a continuous flow of fresh outdoor air into a building to provide ventilation and improved air quality within the building. The outdoor air may be conditioned prior to entering the building by flowing across a heat exchange area of the evaporator, which absorbs thermal energy from the outdoor air. Accordingly, ductwork extending throughout the building may supply the conditioned air to various rooms or zones of the building.

In some cases, stale indoor air may be discharged from the building and directed through an economizer of the HVAC system. The economizer may be used to recover energy from the indoor air prior to discharging the indoor air into an ambient environment, such as the atmosphere, thus improving an efficiency of the HVAC system. For example, in cases when the HVAC system is operating in a cooling mode, the indoor air discharging from the building may be cooler than the outdoor air entering the HVAC system. The economizer may include heat transfer components, such as an energy recovery ventilation (ERV) wheel, which enables heat transfer between the warmer outdoor air and the cooler indoor air passing through the economizer. As such, the economizer may pre-cool the outdoor air before the outdoor air passes through the evaporator of the HVAC system. Unfortunately, the economizer may be unable to extract substantially all thermal energy from the discharging indoor air, thus decreasing an energy efficiency of the HVAC system.

SUMMARY

The present disclosure relates to a heating, ventilation, and/or air conditioning (HVAC) system including an exhaust plenum configured to receive an exhaust air flow from a cooling load. The HVAC system also includes a condenser configured to receive an input air flow and transfer thermal energy to the input air flow. A panel is positioned directly adjacent to and between the exhaust plenum and the condenser and includes a passage providing a fluid flow path directly between exhaust plenum and the condenser. The passage is configured to discharge a portion of the exhaust air flow, and the input air flow includes the portion.

The present disclosure also relates to a heating, ventilation, and/or air conditioning (HVAC) system including an exhaust plenum and a condenser separated by a panel disposed directly adjacent to and between the exhaust plenum and the condenser. The panel includes a passage configured to direct an exhaust air flow from the exhaust plenum to the condenser. The HVAC system also includes a controller, where the controller is configured to receive a signal indicative of an air characteristic of the exhaust air flow via a sensor. The controller is configured to compare a value associated with the signal with a target air characteristic value and instruct a flow regulator to move toward an open position when the value associated with the signal is less than the target air characteristic value, where the flow regulator is configured to modulate a flow rate of the exhaust air flow through the passage.

The present disclosure also relates to a heating, ventilation, and/or air conditioning (HVAC) system including a condenser configured to receive an input air flow and an exhaust plenum disposed adjacent to the condenser, where the exhaust plenum is configured to receive an exhaust air flow. The HVAC system includes a panel positioned directly adjacent to and between the condenser and the exhaust plenum, where the panel comprises a passage forming a flow path between the condenser and the exhaust plenum. A conduit is coupled to the panel and in fluid communication with the passage. The conduit includes a first outlet oriented toward the condenser and a second outlet oriented away from the condenser. The HVAC system also includes a flow regulator disposed within the conduit and configured to transition between a first position and a second position, where the flow regulator is configured to occlude the first outlet in the first position and occlude the second outlet in the second position.

BRIEF DESCRIPTION OF THE DRAWINGS

Various aspects of this disclosure may be better understood upon reading the following detailed description and upon reference to the drawings in which.

DETAILED DESCRIPTION

Figure 1:
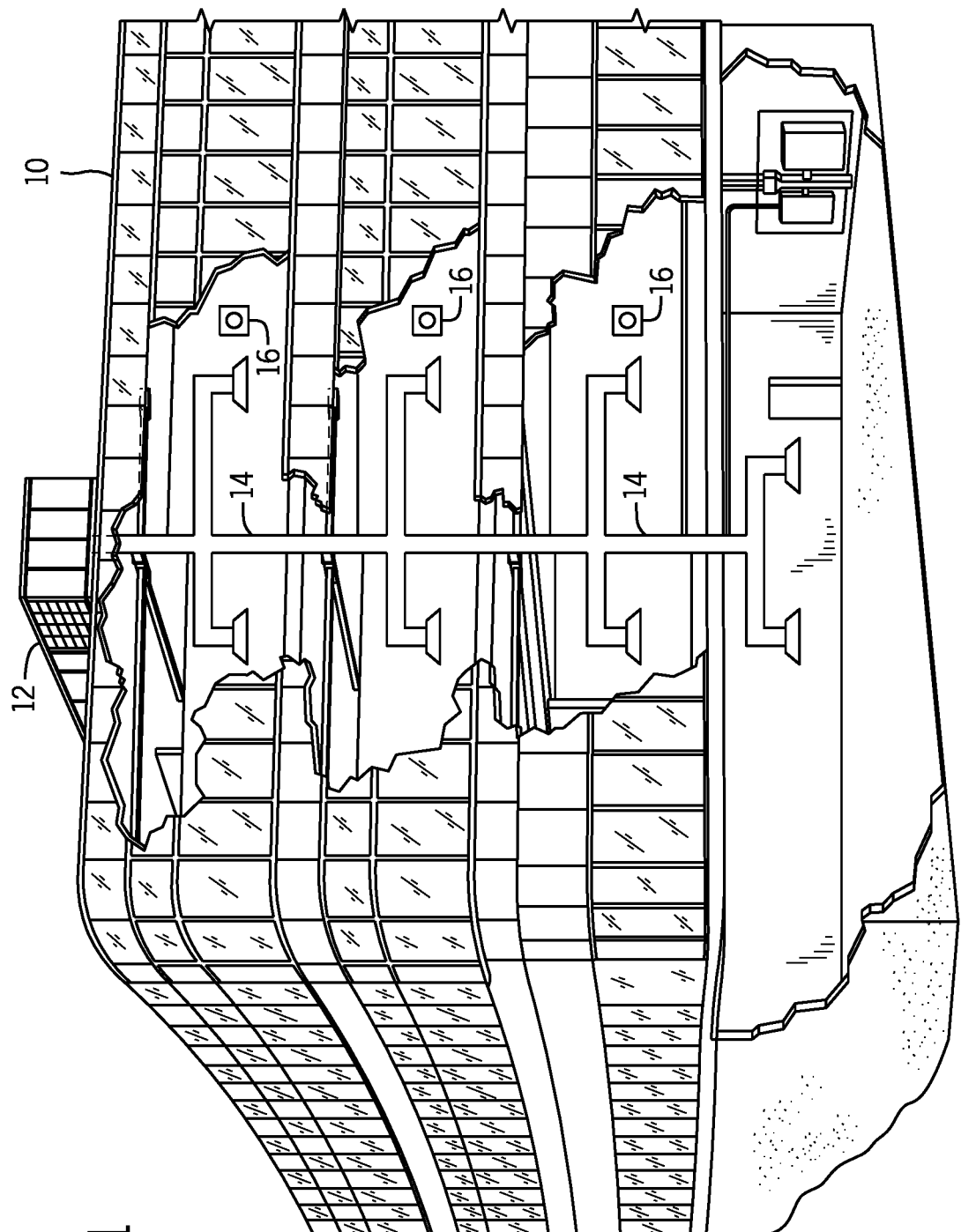
FIG. 1 is a perspective view of an embodiment of a building that may utilize a heating, ventilation, and air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A heating, ventilation, and air conditioning (HVAC) system may be used to thermally regulate a space within a building, home, or other suitable structure. For example, the HVAC system may include a vapor compression system that transfers thermal energy between a heat transfer fluid, such as a refrigerant, and a fluid to be conditioned, such as air. The vapor compression system may include a condenser and an evaporator that are fluidly coupled to one another via a conduit. A compressor may be used to circulate the refrigerant through the conduit and, thus, enable the transfer of thermal energy between the condenser and the evaporator.

In many cases, the evaporator of the HVAC system may be used to condition a flow of air entering a building from an ambient environment, such as the atmosphere. For example, in cases when the HVAC system is operating in a cooling mode, a supply duct may direct outdoor air across a heat exchange area of the evaporator, such that the refrigerant within the evaporator absorbs thermal energy from the outdoor air. Accordingly, the evaporator cools the outdoor air before the outdoor air is directed into the building. In some cases, the refrigerant within the evaporator may absorb sufficient thermal energy to boil, such that the refrigerant exits the evaporator in a hot, gaseous phase. The compressor circulates the gaseous refrigerant toward the condenser, which may be used to remove the absorbed thermal energy from the refrigerant. For example, ambient air from the atmosphere may be drawn through a heat exchange area of the condenser, such that the gaseous refrigerant transfers thermal energy to the ambient air. In many cases, the condenser may enable the refrigerant to change phase, or condense, from the gaseous phase to the liquid phase, such that the liquid refrigerant may be redirected toward the evaporator for reuse.

In certain cases, the HVAC system may exhaust stale air from within the building while simultaneously directing the conditioned air into the building. Accordingly, a continuous supply of fresh air may be circulated through an interior of the building, which may improve an air quality within the building. In some cases, the HVAC system may direct indoor air discharged from the building through an economizer prior to releasing the indoor air into the atmosphere. The economizer may use heat transfer components, such as an energy recovery ventilation (ERV) wheel, to recover thermal energy from the discharging indoor air. For example, fresh outdoor air entering the HVAC system may be of a higher temperature than the indoor air discharging from the building. The economizer may facilitate heat transfer between the outdoor air to be cooled and the discharging indoor air, such that the cooler indoor air may absorb thermal energy from the incoming and warmer outdoor air. Therefore, the economizer may pre-cool the outdoor air before the outdoor air flows through the evaporator of the HVAC system. This may decrease an amount of energy used by the HVAC system to cool the incoming outdoor air, thereby increasing an efficiency of the HVAC system. In certain cases, the indoor air may be discharged into the atmosphere after flowing through the economizer. It is now recognized that an energy efficiency of the HVAC system may be improved by directing the discharged indoor air across the condenser of the vapor compression system in parallel to the economizer and/or the evaporator. Directing the discharged indoor air across the condenser may lower a saturation temperature of the condenser and, thus, increase the efficiency of the HVAC system.

Embodiments of the present disclosure are directed to an energy recovery system that may be used to capture air discharging from an exhaust duct of indoor air, and direct this air across the condenser of the vapor compression system. For example, the energy recovery system may include an energy recovery conduit that extends between an outlet of a central housing of the HVAC system and the condenser, such that air discharging from the exhaust duct is directed toward a heat exchange area of the condenser. In some embodiments, the energy recovery conduit may include an inlet damper, which may regulate an amount of air entering the energy recovery conduit from the central housing. One or more fans may facilitate a flow of air from an upstream end portion of the energy recovery system toward a downstream end portion of the energy recovery system near the condenser. The downstream end portion of the energy recovery system may include a primary outlet extending toward the condenser and the upstream end portion of the energy recovery system may include a secondary outlet that enables the flow of air to bypass the condenser. The primary and second secondary outlets may include a primary damper and a secondary damper, respectively. Accordingly, the primary damper and the secondary damper may control the egress of air from the energy recovery system and direct the air flowing through the energy recovery system across the condenser or allow the air to bypass the condenser and discharge directly into the atmosphere.

In some embodiments, the energy recovery system may include an energy recovery flow path, such as an internal energy recovery flow path or passage, that extends through a dividing panel of the HVAC system. The energy recovery flow path may be used in addition to, or in lieu of the energy recovery conduit to direct air discharging from the exhaust duct toward the condenser. As described in greater detail herein, the dividing panel separates the condenser from an exhaust section of the HVAC system, which is configured to receive air discharging from the exhaust duct. Accordingly, the internal energy recovery flow path may enable air within the exhaust section to flow through the dividing panel and directly toward the heat exchange area of the condenser. In some embodiments, one or more fans may be disposed adjacent the dividing panel to facilitate direction of the air toward the condenser. A bypass damper may be disposed adjacent to the dividing panel to control the egress of air from the exhaust section. In certain embodiments, a diversion conduit is coupled to the dividing panel, which may be used to direct the air discharging along the energy recovery flow path and toward the condenser or away from the condenser. For example, the diversion conduit may include a first outlet oriented toward the condenser and a second outlet oriented away from the condenser. A diversion damper is disposed within the diversion conduit and is configured to selectively open or occlude the first and second outlets. Accordingly, the diversion damper may direct air flowing along the internal energy recovery flow path through the first outlet, such that substantially all of the discharging air flows across the condenser, or through the second outlet, such that substantially all of the discharging air bypasses the condenser and flows directly into the atmosphere.

In some embodiments, the energy recovery system may include a controller that is communicatively coupled to, and configured to control, the inlet damper, the primary damper, the secondary damper, the fan(s), the bypass damper, the diversion damper, or any other suitable components of the energy recovery conduit and the HVAC system. The controller may monitor a temperature of air within the energy recovery system and a temperature of air in the ambient environment, such as the atmosphere. In certain embodiments, the controller may position the inlet, primary, secondary, bypass, and/or diversion dampers to direct substantially all air flowing through the energy recovery system across the condenser when a temperature of the air within the energy recovery system is less than a temperature of air within the ambient environment. Conversely, the controller may position the inlet, primary, secondary, bypass, and/or diversion dampers such that substantially all air flowing through the energy recovery system bypasses the condenser when a temperature of the air within the energy recovery system is higher than a temperature of the air within the ambient environment. These and other features will be described below with reference to the drawings.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
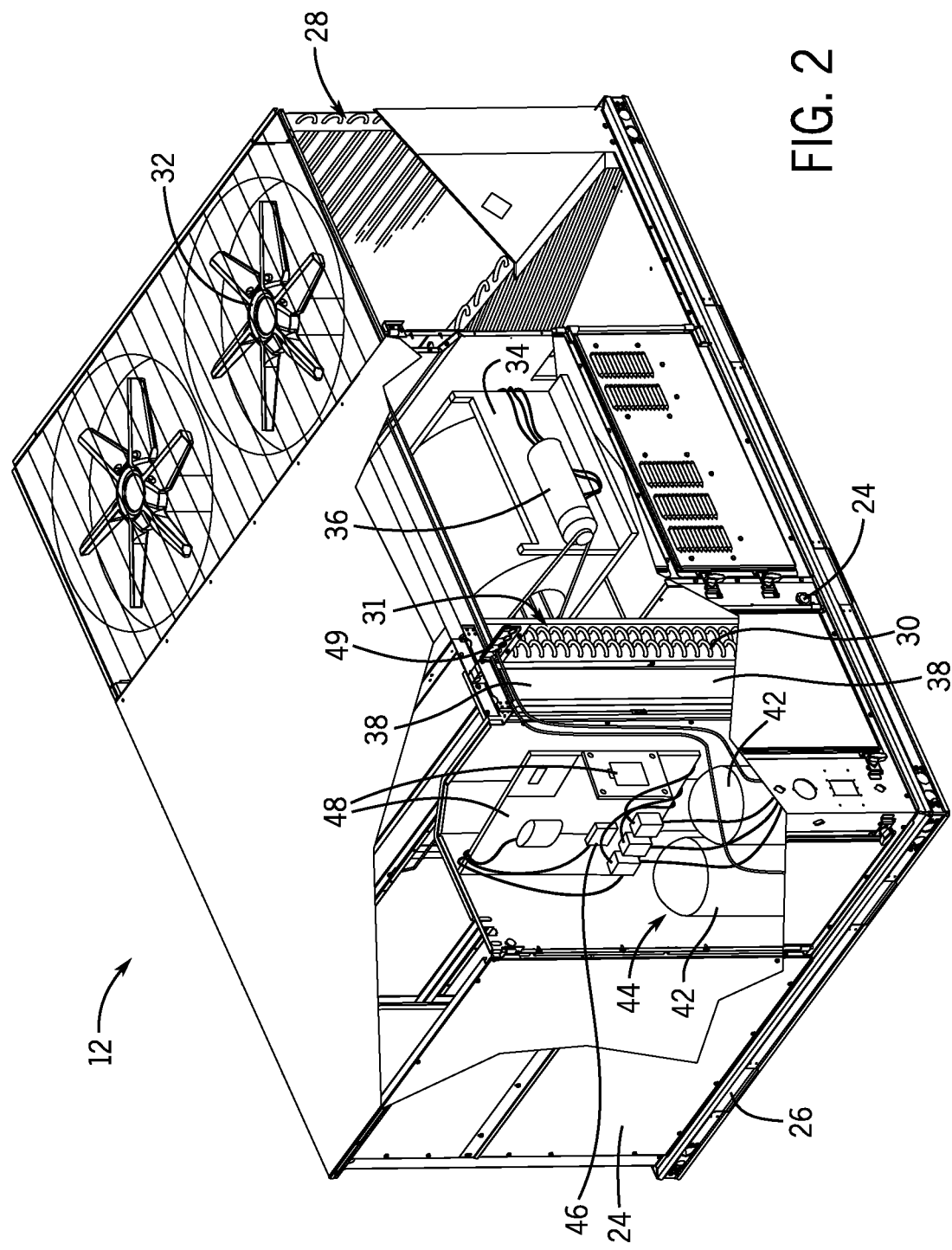
FIG. 2 is a perspective view of a packaged HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
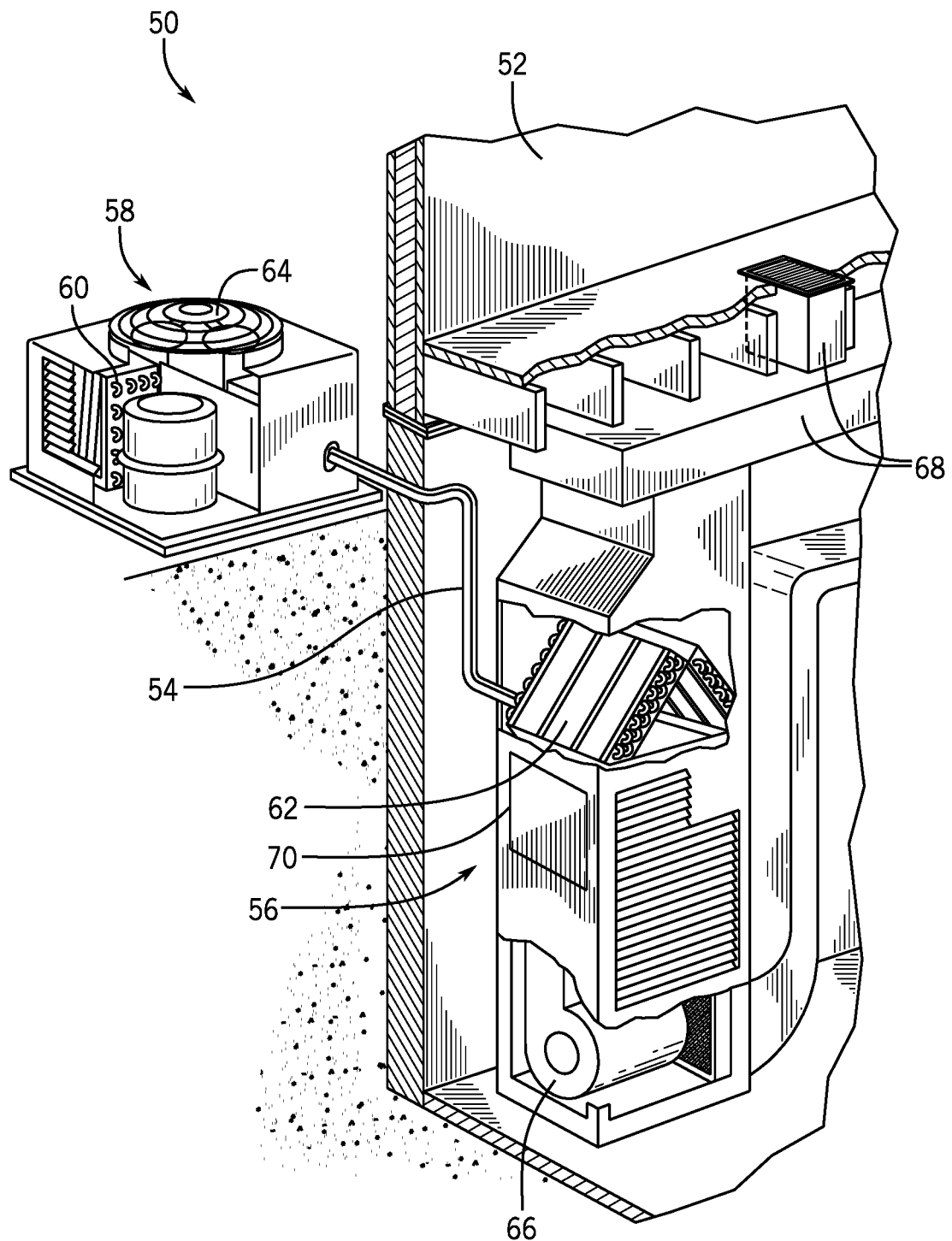
FIG. 3 is a perspective view of a residential HVAC system, in accordance with an aspect of the present disclosure.

FIG. 3 illustrates a residential heating and cooling system, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
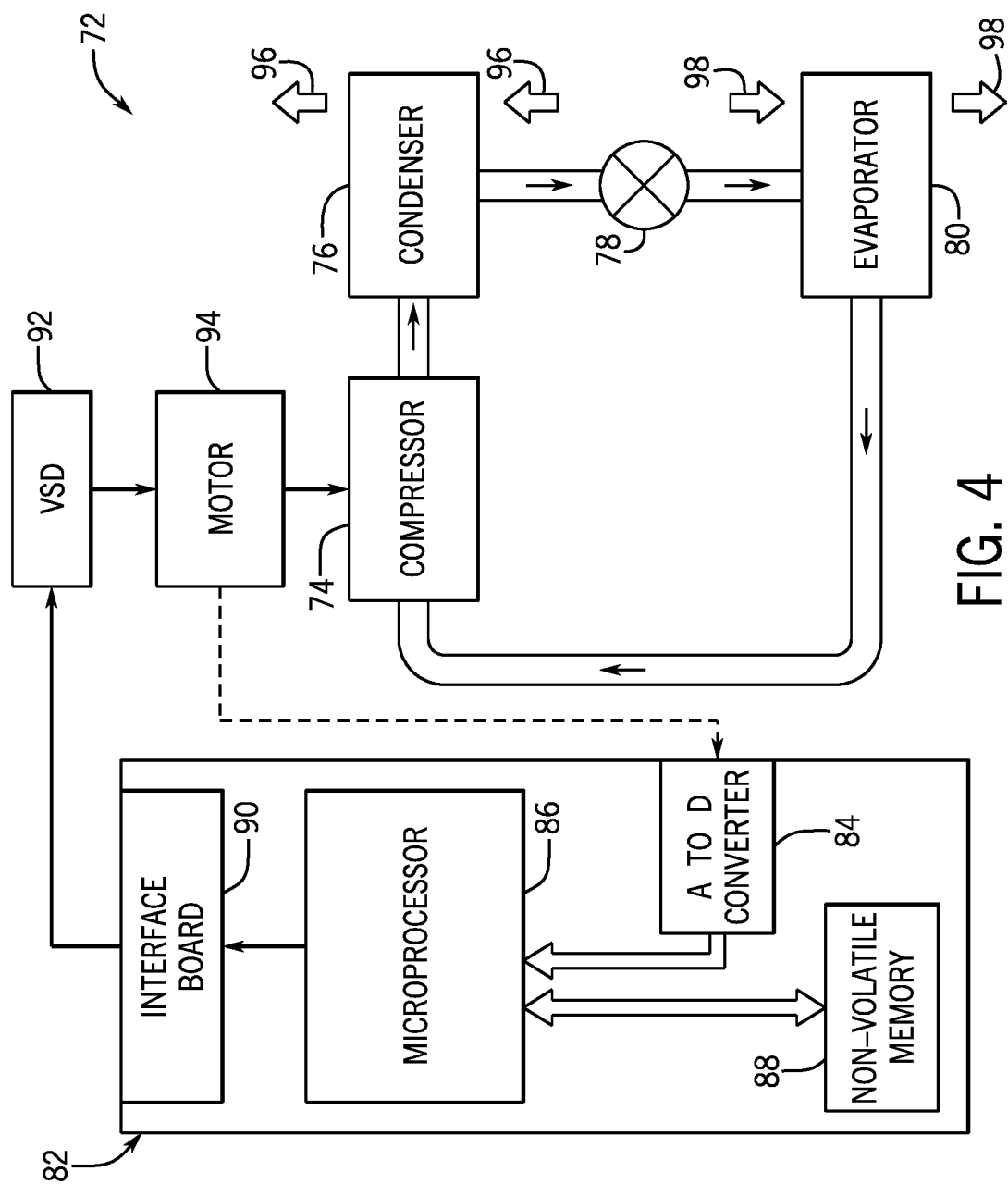
FIG. 4 is a schematic diagram of a vapor compression system that may be used in the packaged HVAC system of FIG. 2 and the residential HVAC system of FIG. 3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or any other suitable HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, embodiments of the present disclosure are directed to an energy recovery system that may be used to direct exhaust air from a cooling load, such as a conditioned space of a building, residential home, or any other suitable structure, across a condenser of an HVAC system. In many cases, a temperature of the exhaust air exiting the cooling load may be less than a temperature of air in the ambient environment. Accordingly, in some embodiments, the energy recovery system may include an energy recovery conduit that couples to, and extends between, an outlet of a central housing of the HVAC system and a condenser, such that air existing the central housing may flow through the energy recovery system and across a heat exchange area of the condenser. Accordingly, the energy recovery system may decrease a saturation temperature of the condenser and, thus, enhance an energy efficiency of the HVAC system.

Figure 5:
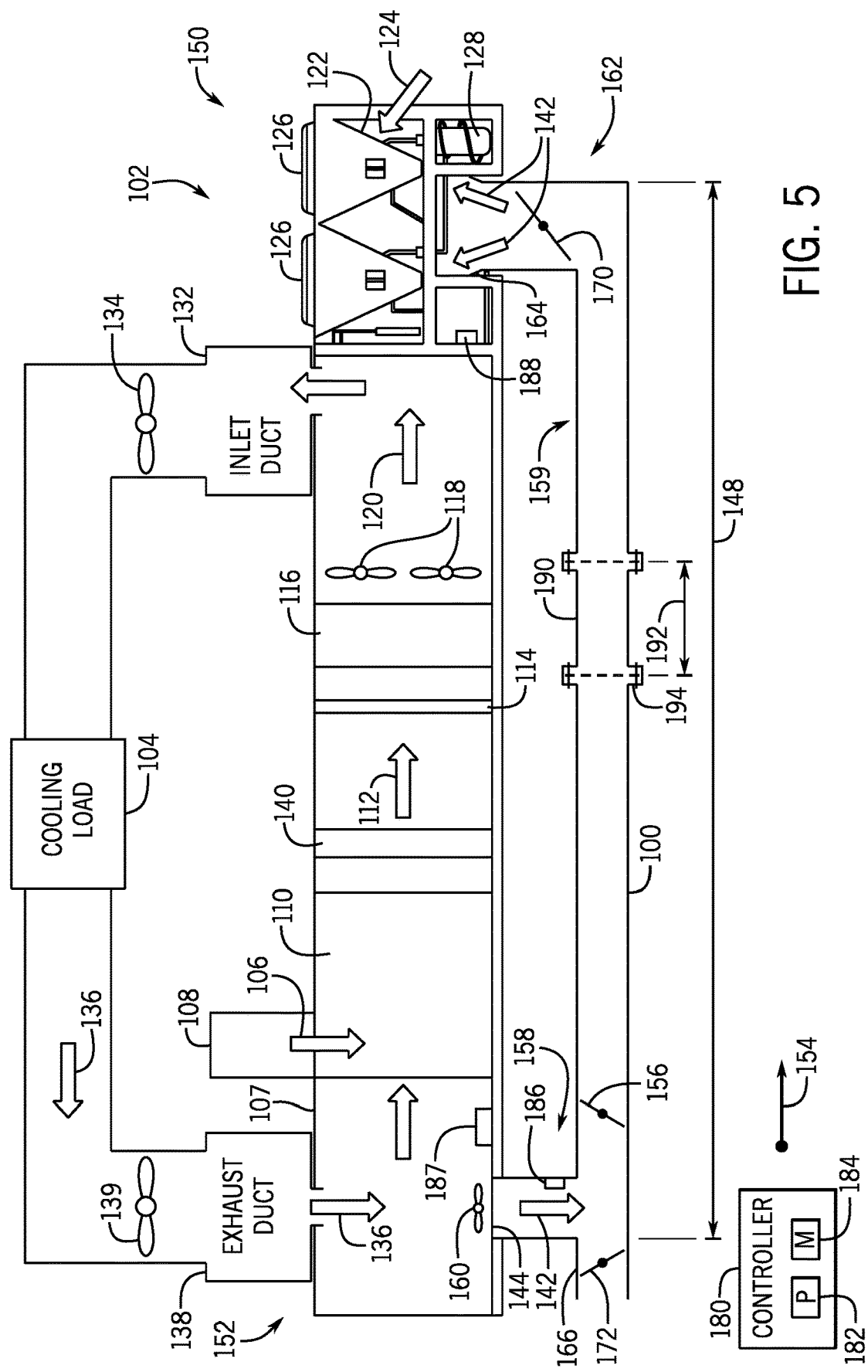
FIG. 5 is a schematic view of an embodiment of an energy recovery conduit that may be used in the HVAC system of FIG. 1, in accordance with an aspect of the present disclosure.

With the foregoing in mind, FIG. 5 illustrates a schematic diagram of an embodiment of an energy recovery system or conduit 100, which may be coupled to a heating, ventilation, and air conditioning (HVAC) system 102. It should be noted that the HVAC system 102 may include embodiments or components of the HVAC unit 12 shown in FIG. 1, embodiments or components of the residential heating and cooling system 50 shown in FIG. 3, a rooftop unit (RTU), or any other suitable HVAC system. The HVAC system 102 may be configured to circulate a flow of conditioned air through a cooling load 104, such as a building, residential home, or any other suitable structure. Accordingly, the HVAC system 102 may maintain a desired air quality and air temperature within the cooling load 104.

For example, fresh outdoor air 106 may be directed into a central housing 107 the HVAC system 102 via an inlet duct 108. As described in greater detail herein, the outdoor air 106 may be pre-cooled using an economizer 110 disposed within the HVAC system 102, such that the outdoor air 106 may exit the economizer 110 as pre-cooled supply air 112. One or more fans 118 draw the supply air 112 across an air filter 114 and across an evaporator 116. In some embodiments, the evaporator 116 may absorb additional thermal energy from the supply air 112, such that the supply air 112 exits the evaporator 116 as conditioned air 120. For example, the one or more fans 118 may direct the supply air 112 across a heat exchange area of the evaporator 116, such that liquid refrigerant within the evaporator 116 absorbs thermal energy, such as heat, from the supply air 112. In other words, the evaporator 116 decreases a temperature of the supply air 112 and, thus, discharges the conditioned air 120 at a temperature that is less than a temperature of the supply air 112.

In many cases, the thermal energy absorbed by the liquid refrigerant within the evaporator 116 may heat the liquid refrigerant to a hot, gaseous phase. The gaseous refrigerant is directed through a condenser 122, which may remove the absorbed thermal energy from the refrigerant and transfer the thermal energy to a cooling fluid, such as ambient air 124 from the atmosphere. For example, one or more condenser fans 126 may direct a flow of the ambient air 124 across a heat exchange area of the condenser 122, such that the ambient air 124 absorbs thermal energy from the gaseous refrigerant. The ambient air 124 may be discharged into the atmosphere after passing through the heat exchange area of the condenser 122. Accordingly, the gaseous refrigerant may condense into a liquid phase, such that a compressor 128 of the HVAC system 102 may redirect the liquid refrigerant toward the evaporator 116.

The conditioned air 120 may be directed into an inlet duct 132 that fluidly couples the cooling load 104 to the HVAC system 102. In some embodiments, an inlet duct fan 134 may facilitate directing the conditioned air 120 toward the cooling load 104. The conditioned air 120 may flow through the cooling load 104, and exit the cooling load 104 as exhaust air 136. For example, the conditioned air 120 may absorb thermal energy from the cooling load 104, such that the exhaust air 136 exits the cooling load 104 at a temperature greater than a temperature of the conditioned air 120. The exhaust air 136 may be directed toward the HVAC system 102 through an exhaust duct 138, which fluidly couples the HVAC system 102 and the cooling load 104. Similarly to the inlet duct 132, an exhaust duct fan 139 may be disposed within the exhaust duct 138 and facilitate directing the exhaust air 136 from the cooling load 104 toward the HVAC system 102. The exhaust air 136 may subsequently flow from the exhaust duct 138 into the economizer 110.

As discussed above, the economizer 110 may enable the exhaust air 136 exiting the cooling load 104 to pre-cool the outdoor air 106 entering the HVAC system 102. For example, when the HVAC system 102 is operating in a cooling mode, a temperature of the conditioned air within the cooling load 104 may be less than a temperature of the outdoor air 106 entering the HVAC system 102 from the ambient environment. The economizer 110 may include a plurality of heat exchange devices, such as an energy recovery ventilation (ERV) wheel, which may transfer thermal energy, such as heat, from the outdoor air 106 entering the HVAC system 102 to the exhaust air 136. As such, the outdoor air 106 may exit the economizer 110 as pre-cooled supply air 112, which is of a lower temperature than the outdoor air 106. In some embodiments, a portion of the exhaust air 136 may bypass the economizer 110 and recirculate through the HVAC system 102 and the cooling load 104. In such embodiments, an air mixer 140 may be disposed downstream of the economizer 110, such that the air mixer 140 may blend the supply air 112 and the exhaust air 136 bypassing the economizer 110.

Further, the exhaust air 136 may bypass the economizer 110 through an outlet 144 of the central housing 107 as recovery air 142, which may then be directed into the energy recovery conduit 100. As described in greater detail herein, the energy recovery conduit 100 may extend between the outlet 144 of the central housing 107 and the condenser 122, such that the recovery air 142 exiting the central housing 107, and bypassing the economizer 110, is directed toward a heat exchange area of the condenser 122. In some embodiments, the condenser 122 may be disposed near a downstream end portion 150 of the HVAC system 102, while the economizer 110 is disposed near an upstream end portion 152 of the HVAC system 102. Accordingly, the energy recovery conduit 100 may direct the recovery air 142 in a downstream direction 154 along the HVAC system 102 from the outlet 144 of the central housing 107 and to the condenser 122, while bypassing the economizer 110. As such, a length 148 of the energy recovery conduit 100 may be relatively large and/or may be a substantial portion of a length of central the housing 107. For example, the length 148 of the energy recovery conduit 100 may be 1, 5, 10, 20, 30 or more meters long.

In some embodiments, the energy recovery conduit 100 may include an inlet damper 156 disposed near an upstream end portion 158 of the energy recovery conduit 100. The inlet damper 156 may regulate a flow rate of the recovery air 142 entering the energy recovery conduit 100. For example, moving the inlet damper 156 to a fully open position may enable the exhaust air 136 entering the outlet 144 of the central housing 107 to discharge into the energy recovery conduit 100 as recovery air 142 without substantial hindrance. Conversely, moving the inlet damper 156 to a fully closed position may block exhaust air 136 from entering the energy recovery conduit 100. In some embodiments, adjusting the inlet damper 156 to the fully closed position enables substantially all exhaust air 136 to enter the economizer 110 and recirculate through the HVAC system 102. In other embodiments, adjusting the inlet damper 156 to the fully closed position may enable at least a portion of the exhaust air 136 to be emitted through an outlet of the energy recovery conduit 100, as discussed below. In certain embodiments, the energy recovery conduit 100 may be circumscribed by insulating material 159, such as fiberglass, aluminum foil, or cork, which may mitigate heat transfer between the recovery air 142 within the energy recovery conduit 100 and the ambient environment.

The central housing 107 may include a conduit fan 160, which facilitates directing the recovery air 142 along the length 148 of the energy recovery conduit 100. As such, the conduit fan 160 may direct the recovery air 142 toward a downstream end portion 162 of the energy recovery conduit 100. As described in greater detail herein, the downstream end portion 162 of the energy recovery conduit 100 may include a primary outlet 164, which may direct the recovery air 142 toward the condenser 122. Additionally, the upstream end portion 158 of the energy recovery conduit 100 may include a secondary outlet 166, which may enable the recovery air 142 to bypass the condenser 122 and/or otherwise exit the energy recovery conduit 100. In some embodiments, the primary outlet 164 and the secondary outlet 166 include a primary damper 170 and a secondary damper 172, respectively. The primary and secondary dampers 170, 172 may be configured to regulate a flow rate of the recovery air 142 flowing toward the condenser 122 in addition to, or in lieu of, the inlet damper 156 and the conduit fan 160.

For example, moving the primary damper 170 to a fully closed position and moving the secondary damper 172 to a fully open position may enable substantially all of the recovery air 142 flowing into the energy recovery conduit 100 to bypass the condenser 122 and discharge into the ambient environment. Conversely, moving the inlet damper 156 and the primary damper 170 to a fully open position and moving the secondary damper 172 to a fully closed position may enable substantially all of the recovery air 142 to flow toward and across the condenser 122. In some embodiments, the primary outlet 164 of the energy recovery conduit 100 may be disposed below the condenser 122. Accordingly, the energy recovery conduit 100 may discharge the recovery air 142 below the condenser 122, such that the one or more condenser fans 126 may direct the recovery air 142 through the heat exchange area of the condenser 122 alongside the ambient air 124. It should be noted that the energy recovery conduit 100 may direct the recovery air 142 toward any other suitable portion of the condenser 122, such as side portions or top portions of the condenser 122. In any case, the recovery air 142 and the ambient air 124 may be mixed and directed across the condenser 122. As discussed above, a temperature of the recovery air 142 exiting the economizer 110 may be less than a temperature of the ambient environment and, thus, a temperature of the ambient air 124. Accordingly, the recovery air 142 may lower a saturation temperature of the condenser 122, which may improve an efficiency of the HVAC system 102.

In some embodiments, the energy recovery conduit 100 may include a controller 180, or a plurality of controllers, which may be used to control certain components of the energy recovery conduit 100 and/or the HVAC system 102. For example, one or more control transfer devices, such as wires, cables, wireless communication devices, and the like, may communicatively couple the inlet damper 156, the conduit fan 160, the primary damper 170, the secondary damper 172, or any other suitable components of the energy recovery conduit 100 and/or the HVAC system 102, to the controller 180. The controller 180 may include a processor 182, such as a microprocessor, which may execute software for controlling the components of the energy recovery conduit 100 and/or the HVAC system 102. Moreover, the processor 182 may include multiple microprocessors, one or more "general-purpose" microprocessors, one or more special-purpose microprocessors, and/or one or more application specific integrated circuits (ASICS), or some combination thereof.

For example, the processor 182 may include one or more reduced instruction set (RISC) processors. The controller 180 may also include a memory device 184 that may store information such as control software, look up tables, configuration data, etc. The memory device 184 may include a volatile memory, such as random access memory (RAM), and/or a nonvolatile memory, such as read-only memory (ROM). The memory device 184 may store a variety of information and may be used for various purposes. For example, the memory device 184 may store processor-executable instructions including firmware or software for the processor 182 execute, such as instructions for controlling the components of the energy recovery conduit 100 and/or the HVAC system 102. In some embodiments, the memory device 184 is a tangible, non-transitory, machine-readable-medium that may store machine-readable instructions for the processor 182 to execute. The memory device 184 may include ROM, flash memory, a hard drive, or any other suitable optical, magnetic, or solid-state storage medium, or a combination thereof. The memory device 184 may store data, instructions, and any other suitable data.

In some embodiments, the controller 180 may monitor certain operating parameters of the energy recovery conduit 100 and/or the HVAC system 102. The controller 180 may evaluate the monitored operating conditions and determine whether to direct the recovery air 142 through the primary outlet 164 and toward the condenser 122, or whether to discharge the recovery air 142 into the ambient environment through the secondary outlet 166, thus at least partially bypassing the condenser 122. For example, the controller 180 may be communicatively coupled to a recovery air temperature sensor 186 disposed within the energy recovery conduit 100 and an ambient air temperature sensor 188 disposed exterior of the energy recovery conduit 100 and exterior of the HVAC system 102.

In some embodiments, the recovery air temperature sensor 186 may monitor a temperature of the recovery air 142 discharging from the outlet 144 of the central housing 107. Similarly, the ambient air temperature sensor 188 may monitor a temperature of the ambient environment, such as a temperature of the ambient air 124 and/or a temperature of the outdoor air 106. Accordingly, the controller 180 may monitor the temperature of both the recovery air 142 and the ambient air 124 or the outdoor air 106. Additionally or otherwise, the controller 180 may be coupled to any other suitable sensors within the energy recovery conduit 100 and/or the HVAC system 102, such as air quality sensors 187, humidity sensors, or the like. For example, the air quality sensors 187 may measure a quality of air within the cooling load 104, the HVAC system 102, or both.

As discussed above, a temperature of the ambient air 124 may be greater than a temperature of the recovery air 142 during steady state operation of the HVAC system 102. In such an example, the controller 180 may adjust a position of inlet damper 156, the primary damper 170, and the secondary damper 172, such that substantially all of the recovery air 142 is directed toward the condenser 122. However, it should be noted that the temperature of the ambient air 124 may be less than the temperature of the recovery air 142 during certain operational conditions of the HVAC system 102. For example, it may be desirable to increase a temperature of the conditioned air 120 during certain operating hours of the cooling load 104, such that a temperature of the exhaust air 136 and, thus, the recovery air 142, is greater than a temperature of the outdoor air 106.

As a non-limiting example, an office building may increase a desired temperature range of indoor air within the office building, or turn off the HVAC system 102, during non-working hours of the office building, such as overnight hours. In some cases, a temperature of the ambient environment may decrease during the overnight hours, such that a temperature of the outdoor air 106 and the ambient air 124 is less than a temperature of air within the office building. When the HVAC system 102 is restarted during office hours of the building, or when the desired temperature range of the indoor air within the building is decreased, the HVAC system 102 may directly discharge the exhaust air 136 through the outlet 144 of the economizer 110 as the recovery air 142. In such an example, the economizer 110 may be turned off, such that the warmer exhaust air 136 may not exchange heat with the cooler outdoor air 106 entering the HVAC system 102. In other words, the exhaust air 136 and the recovery air 142 may be warmer than the outdoor air 106 entering the HVAC system 102.

As discussed above, the controller 180 may monitor the temperature of recovery air 142 and the ambient air 124 via the recovery air temperature sensor 186 and the ambient air temperature sensor 188, respectively. In some embodiments, the controller 180 may thus instruct the inlet damper 156 and/or the primary damper 170 to move to the fully closed position and the secondary damper 172 to move to the fully open position when a measured temperature of the recovery air 142 is larger than a measured temperature of the ambient air 124. In other words, the controller 180 may compare a first temperature value of the recovery air 142 to a second temperature value of the ambient air 124, and instruct the inlet damper 156 and/or the primary damper 170 to move to the fully closed position and instruct the secondary damper 172 to move to the fully open position when the first temperature value is larger than the second temperature value. Therefore, the recovery air 142 may bypass the condenser 122 during such operating conditions of the HVAC system 102. In certain embodiments, the controller 180 may instruct the inlet damper 156 to move to a fully closed position in addition to, or in lieu of, moving a position of the primary damper 170 and the secondary damper 172, when the recovery air 142 is warmer than the ambient air 124. Conversely, the controller 180 may instruct the inlet damper 156 and/or the primary damper 170 to move to the fully open position and instruct the secondary damper 172 to move to the fully closed position when the first temperature value is less than the second temperature value. Additionally or otherwise, the controller 180 may instruct each of the inlet damper 156, the primary damper 170, and the secondary damper 172 to move to any position between a fully open position and a fully closed position, respectively.

It should be noted that certain embodiments of the HVAC system 102 may not include the economizer 110. In such embodiments, the outdoor air 106 entering the inlet duct 108 may flow directly toward the evaporator 116 of the HVAC system 102. In some cases, substantially no exhaust air 136 may be recirculated through the HVAC system 102 and the cooling load 104. Similar to the above discussion, the controller 180 may thus monitor the temperature of the exhaust air 136 and a temperature of the ambient air 124. Accordingly, the controller 180 may determine whether to direct the exhaust air 136 toward the condenser 122 or whether to release the exhaust air 136 directly into the ambient environment.

For example, if a temperature of the exhaust air 136 is less than a temperature of the ambient air 124, the controller 180 may move the inlet damper 156 and/or the primary damper 170 to the fully open position and the secondary damper 172 to the fully closed position, such that substantially all exhaust air 136 may flow across the heat exchange area of the condenser 122. Conversely, when the temperature of the exhaust air 136 is higher than the temperature of the ambient air 124, the controller 180 may move the inlet damper 156 and/or the primary damper 170 to the fully closed position and move the secondary damper 172 to the fully open position, such that substantially all exhaust air 136 bypasses the condenser 122 and releases directly into the ambient environment.

In some embodiments, the energy recovery conduit 100 may be designed as a retro-fit kit, such that the energy recovery conduit 100 may be installed on existing HVAC systems. For example, the energy recovery conduit 100 may be dimensioned to couple commercial embodiments of the HVAC unit 12 shown in FIG. 1, commercial embodiments the residential heating and cooling system 50 shown in FIG. 3, commercial embodiments of the HVAC system 102, commercial embodiments of a rooftop unit (RTU), or any other suitable HVAC system. In such an example, the length 148 of the energy recovery conduit 100 may be adjustable, such that the energy recovery conduit 100 may extend between the outlet 144 of the economizer 110 and the condenser 122, or the exhaust duct 138 and the condenser 122, of existing HVAC systems.

For example, the energy recovery conduit 100 may include one or more extension conduits 190, which may be used to adjust certain dimensions of the energy recovery conduit 100, such as the length 148. The one or more extension conduits 190 may each have a length 192, such that coupling additional extension conduits 190 to the energy recovery conduit 100 increases the length 148 of the energy recovery conduit 100, while removing extension conduits 190 decreases the length 148 of the energy recovery conduit 100. Accordingly, the extension conduits 190 may enable a total length of the energy recovery conduit 100 to be tailored for a particular HVAC system, which may facilitate retro-fitting the energy recovery conduit 100 to an existing HVAC system. As such, the extension conduits 190 may be used to adjust a flow path of the recovery air 142, which may extend between the outlet 144 of the central housing 107 and the condenser 122. It should be noted that in some embodiments, additional components may be disposed along, or within the flow path of the recovery air 142 in addition to the extension conduits 190. The extension conduits 190 may be coupled to the energy recovery conduit 100 via fasteners 194, such as clamps, bolts, adhesives, or any other suitable fasteners. In some embodiments, additional or fewer of the extension conduits 190 may be coupled to the primary outlet 164 and/or the secondary outlet 166 or the energy recovery conduit 100, which may further facilitate tailoring dimensions of the energy recovery conduit 100 to a particular HVAC system. As such, retro-fitting of the energy recovery conduit 100 to an existing HVAC system may enable the energy recovery conduit 100 to effectively direct the recovery air 142 toward a condenser of the existing HVAC system.

Figure 6:
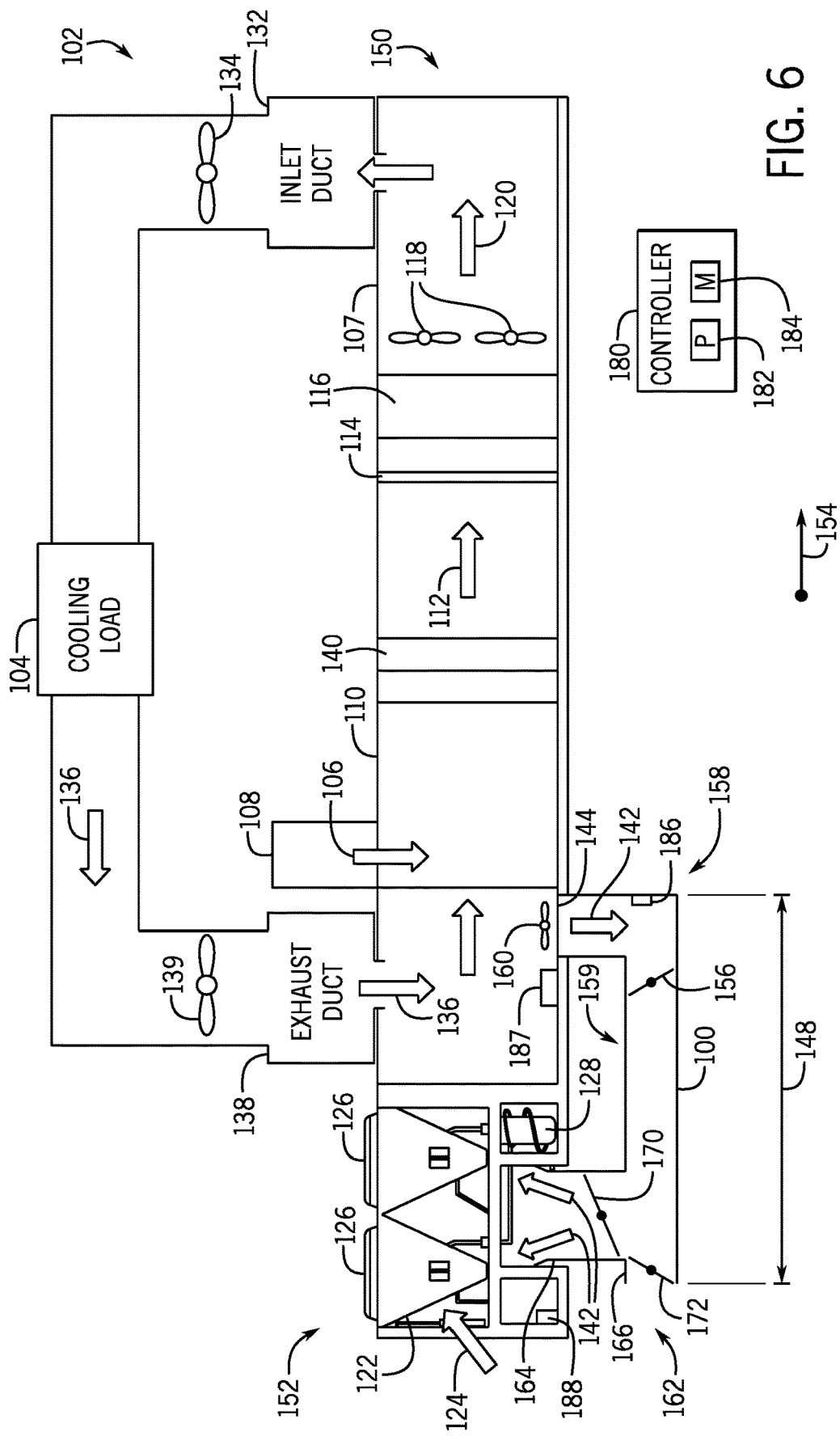
FIG. 6 is a schematic view of an embodiment of an HVAC system using the energy recovery conduit of FIG. 5, in accordance with an aspect of the present disclosure.

In some embodiments, a configuration of the HVAC system 102 may be adjusted to enhance an efficiency of the energy recovery conduit 100 and, thus, enhance an efficiency of the HVAC system 102 itself. For example, FIG. 6 illustrates a schematic diagram of an embodiment of the HVAC system 102 in which both the economizer 110 and the condenser 122 are disposed near the upstream end portion 152 of the HVAC system 102. As such, the length 148 of the energy recovery conduit 100 may be relatively small, because the distance between the outlet 144 of central housing 107 and the condenser 122 is decreased, as compared to the embodiment shown in FIG. 5. In some embodiments, decreasing the length 148 of the energy recovery conduit 100 may mitigate heat transfer between the ambient environment and the recovery air 142. As such, when the length 148 of the energy recovery conduit 100 is substantially small, the temperature of the recovery air 142 exiting the central housing 107 via the outlet 144 may be substantially equal to a temperature of the recovery air 142 exiting the primary outlet 164. In some embodiments, decreasing the length 148 of the energy recovery conduit 100 may enable a size of the conduit fan 160 to be decreased or may enable the conduit fan 160 to be eliminated entirely, thus decreasing electric power consumption of the energy recovery conduit 100. Further, decreasing the length 148 of the energy recovery conduit 100 may decrease an amount of insulating material 159 used to insulate the energy recovery conduit 100, which may decrease manufacturing costs of the energy recovery conduit 100.

Figure 7:
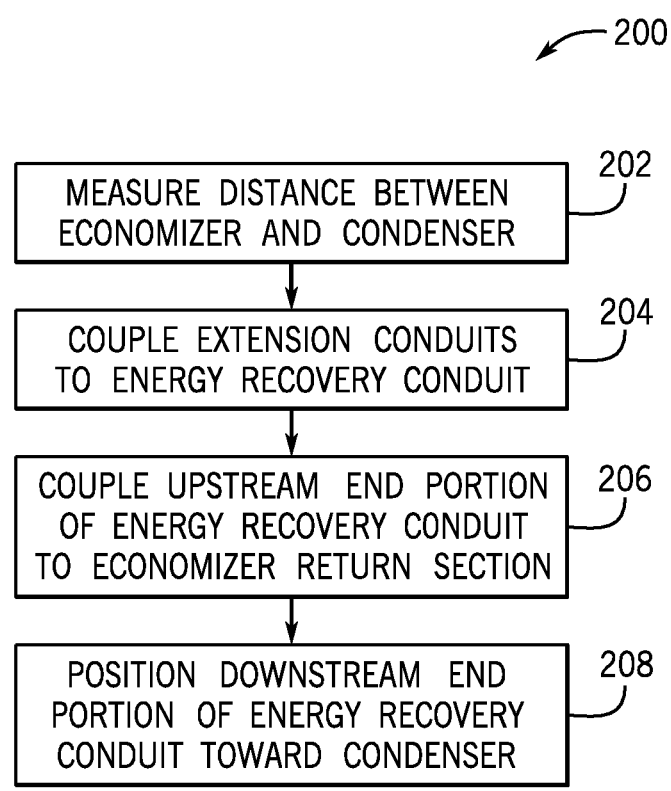
FIG. 7 is an embodiment of a method of retro-fitting the energy recovery conduit of FIG. 5, in accordance with an aspect of the present disclosure.

With the foregoing in mind, FIG. 7 is an embodiment of a method 200 of retro-fitting the energy recovery conduit 100 onto existing HVAC systems, such as commercial embodiments of the HVAC unit 12 shown in FIG. 1, commercial embodiments the residential heating and cooling system 50 shown in FIG. 3, commercial embodiments of the HVAC system 102, commercial embodiments of a rooftop unit (RTU), or any other suitable HVAC system. The method includes measuring a distance between the outlet 144 of the central housing 107 and the condenser 122 of the HVAC system 102, as indicated by process block 202. Specifically, a linear distance between the outlet 144 of the central housing 107 and an underside of the condenser 122 may be measured. Accordingly, the length 148 of the energy recovery conduit 100 may be adjusted for a particular HVAC system, such that the energy recovery conduit 100 may most suitably couple to that HVAC system. For example, a service technician may couple, as indicated by process block 204, the one or more extension conduits 190 to the energy recovery conduit 100, such that the length 148 of the energy recovery conduit 100 is substantially close to the measured linear distance between the outlet 144 of the central housing 107 and the condenser 122.

The service technician may couple, as indicated by processes block 206, the upstream end portion 158 of the energy recovery conduit 100 to the outlet 144 of the central housing 107. The upstream end portion 158 may be coupled to the outlet 144 using any suitable fasteners, such as clamps, bolts, welding, or adhesives. In some embodiments, a diameter and/or geometric shape of the outlet 144 may be different than a diameter and/or geometric shape of the energy recovery conduit 100. In such embodiments, a variety of flanges or adapters may be used to enable the outlet 144 of the economizer 110 to interface with the energy recovery conduit 100. In certain embodiments, an existing HVAC system may not include an outlet disposed within the central housing 107. In such case, the service technical may puncture a portion of the central housing 107 to create an aperture, over which the energy recovery conduit 100 may be disposed.

The service technician may position, as indicated by process block 208, the downstream end portion 162 of the energy recovery conduit 100 toward the condenser 122, such that the recovery air 142 exiting the energy recovery conduit 100 may be discharged under the condenser 122. Accordingly, the one or more condenser fans 126 may draw the recovery air 142 through the heat exchange area of the condenser 122 alongside the ambient air 124. As such, the energy recovery conduit 100 may be used to redirect previously unused exhaust air of an existing HVAC system toward a condenser of the HVAC system, thus improving an efficiency of the HVAC system.

Figure 8:
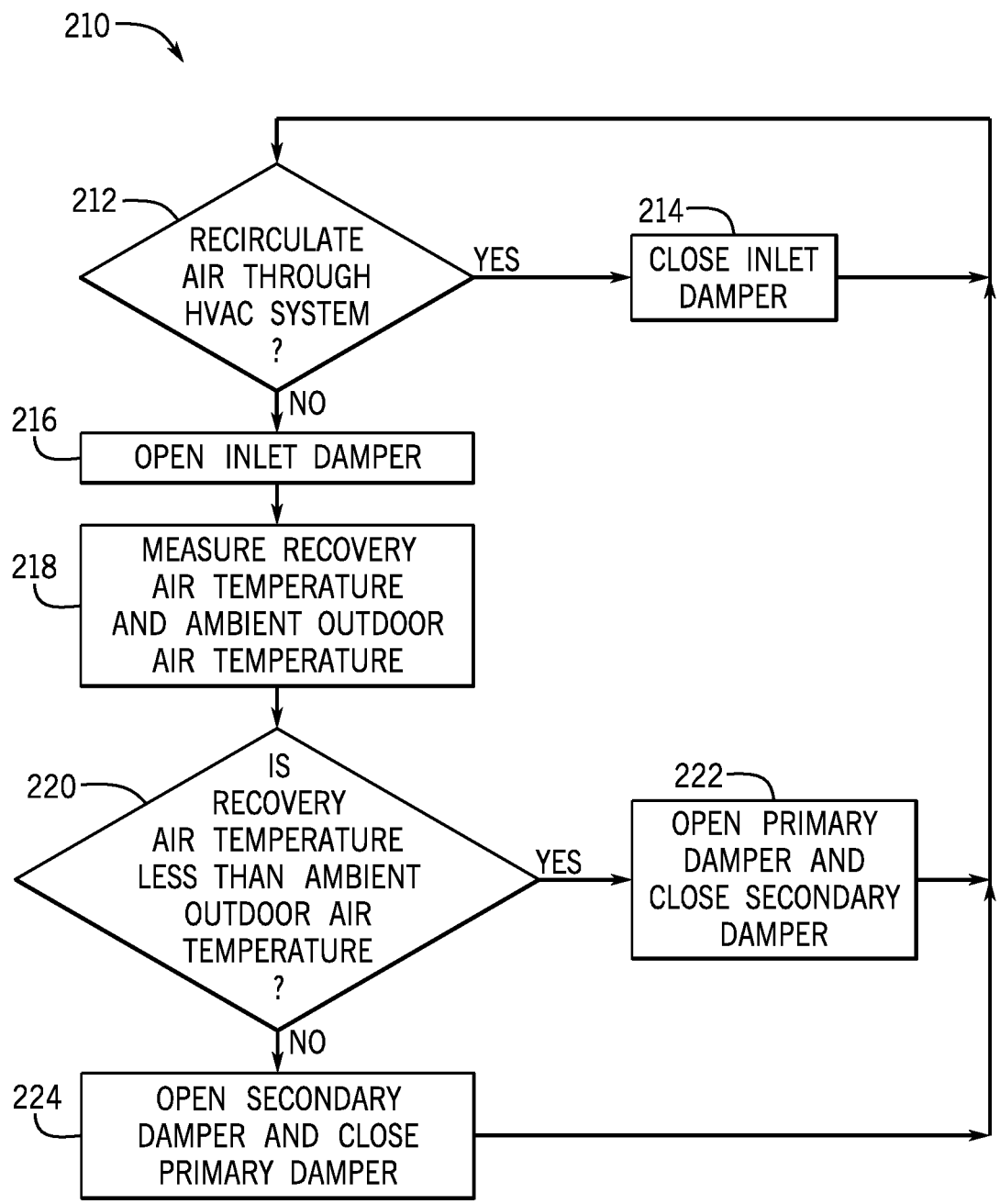
FIG. 8 is an embodiment of a method of operating the energy recovery conduit of FIGS. 5 and 6, in accordance with an aspect of the present disclosure.

FIG. 8 is an embodiment of a method of operating the energy recover system. The method may begin with determining an amount of exhaust air 136 to be recirculated through the HVAC system 102, as indicated by decision block 212. For example, the controller 180 may measure an air quality of the exhaust air 136 using sensors within the HVAC system 102, such as the air quality sensors 187, and determine whether the air quality is above or below a predetermined threshold value. If the air quality of the exhaust air 136 is above the predetermined threshold value, the controller 180 may instruct the inlet damper 156 and/or the secondary damper 172 to close, or partially close, as indicated by process block 214. Accordingly, a substantial portion of the exhaust air 136 may be recirculated through the HVAC system 102. Conversely, if the measured air quality of the exhaust air is below the predetermined threshold value, the controller 180 may instruct the inlet damper 156 to open, or partially open, as indicated by process block 216. As such, the exhaust air 136 may be discharged from the central housing 107 of the HVAC system 102 as recovery air 142, while outdoor air 106 from the ambient environment may be directed into the HVAC system 102.

The controller 180 may measure the temperature of the recovery air 142 and the temperature of the ambient air 124 using the recovery air temperature sensor 186 and the ambient air temperature sensor 188, respectively, as indicated by process block 218. The controller 180 may determine, as indicated by decision block 220, if the temperature of the recovery air 142 is less than the temperature of the ambient air 124. If the temperature of the recovery air 142 is less than the temperature of the ambient air 124, the controller 180 may instruct the inlet damper 156 and/or the primary damper 170 to move to the open position and instruct the secondary damper 172 to move to the closed position, as indicated by process block 222. As discussed above, the recovery air 142 may thus flow across the condenser 122, thereby decreasing a saturation temperature of the condenser 122 and increasing an energy efficiency of the HVAC system 102. Conversely, if the temperature of the recovery air 142 is greater than the temperature of the ambient air 124, the controller 180 may instruct the inlet damper 156 and/or the primary damper 170 to move to the closed position and instruct the secondary damper 172 to move to the open position, as indicated by process block 224. Accordingly, the recovery air 142 may be discharged from the energy recovery conduit 100 without flowing across the condenser 122. In some embodiments, the controller 180 may thus maintain a threshold quality of air circulating through the HVAC system 102, while simultaneously determining whether to direct the recovery air 142 across the condenser 122, or, enable the recovery air 142 to bypass the condenser 122 and discharge directly into the ambient environment.

Figure 9:
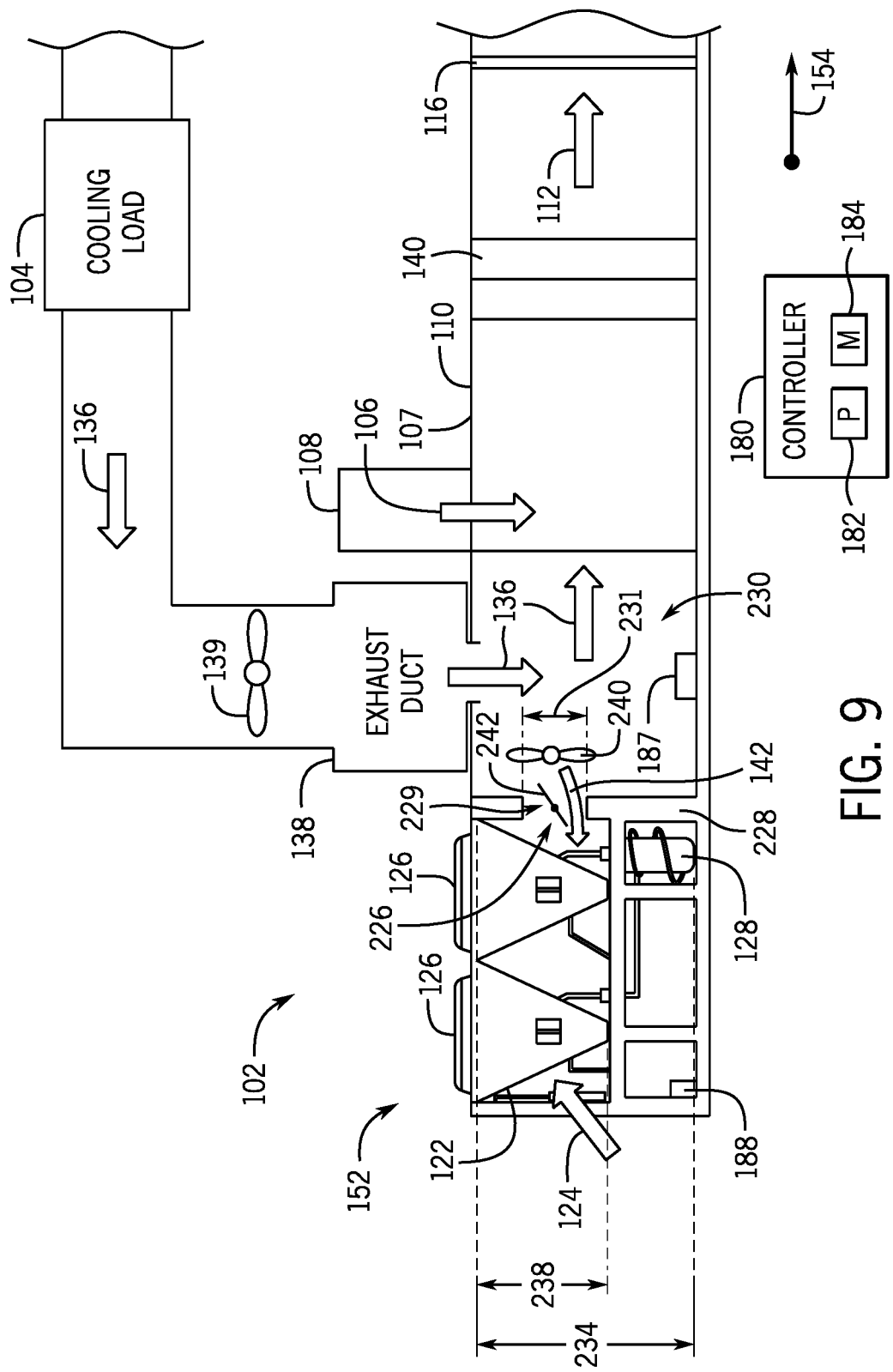
FIG. 9 is a schematic view of an embodiment of the HVAC system of FIG. 6, illustrating an energy recovery flow path through a panel of the HVAC system, in accordance with an aspect of the present disclosure.

In some embodiments, the energy recovery system may direct a portion of the exhaust air 136, or all of the exhaust air 136, directly from the central housing 107 of the HVAC system 102 to the condenser 122 without the use of a separate, dedicated conduit, such as the energy recovery conduit 100. Advantageously, such a configuration may decrease a quantity of dampers included in the energy recovery system and/or reduce a size of the energy recovery system, which may decrease manufacturing costs and/or maintenance costs of the energy recovery system. For example, FIG. 9 illustrates a schematic diagram of an embodiment of the upstream end portion 152 of HVAC system 102, which includes a recovery passage 226 that is formed in a dividing panel 228 of the central housing 107. As shown in the illustrated embodiment, the dividing panel 228 is disposed between the condenser 122 and an exhaust plenum 230 of the HVAC system 102. Accordingly, the dividing panel 228 separates the condenser 122 from an interior volume of exhaust plenum 230. For clarity, it should be noted that the exhaust plenum 230 may include any suitable portion of the central housing 107 extending between the dividing panel 228 and the economizer 110. In embodiments of the HVAC system 102 that do not include the economizer 110, the exhaust plenum 230 may be defined as any suitable portion of the central housing 107 extending between the dividing panel 228 and the evaporator 116. In other words, the exhaust plenum 230 of the HVAC system 102 may include a portion of the central housing 107 configured to receive the exhaust air 136 from the exhaust duct 138 of the cooling load 104.

In any case, as shown in the illustrated embodiment of FIG. 9, the recovery passage 226 defines a flow path 229 that extends directly between the exhaust plenum 230 and the condenser 122. The recovery passage 226 may thus enable a portion of the exhaust air 136 entering the exhaust plenum 230, or all of the exhaust air 136 entering the exhaust plenum 230, to discharge from the exhaust plenum 230 and flow toward the condenser 122 as the recovery air 142. A remaining portion of the exhaust air 136 may flow toward the economizer 110 and/or the evaporator 80 of the HVAC system 102. The condenser fans 126 may draw the recovery air 142 across the heat exchange area of the condenser 122 concurrently with the ambient air 124. As noted above, a temperature of the recovery air 142 may be less than a temperature of the ambient air 124 during certain operational periods of the HVAC system 102. Directing the recovery air 142 across the condenser 122 may thus lower a saturation temperature of the condenser 122, which may improve an efficiency of the HVAC system 102. For clarity, it should be noted that an air flow across the condenser 122 is also referred to herein as an input air flow. That is, the input air flow may include a flow of the ambient air 124, a flow of the recovery air 142, or a flow of both the ambient air 124 and the recovery air 142. In any case, the condenser 122 enables the transfer of thermal energy between refrigerant circulating through the condenser 122 and the input air flow.

The recovery passage 226 may include a circular cross-sectional shape, a rectangular cross-sectional shape, or any other suitable cross-sectional shape to facilitate flowing the recovery air 142 from the exhaust plenum 230 to the condenser 122. In some embodiments, a cross-sectional area of the recovery passage 226 may be proportioned to discharge a predetermined flow rate of the recovery air 142. For example, the exhaust air 136 entering the exhaust plenum 230 may pressurize the exhaust plenum 230 to certain pressure level during operation of the HVAC system 102. A magnitude of this pressure level may be determined using computer simulation models, such as computational fluid dynamics software, or via empirical trials, in which pressure measuring instruments are disposed within the exhaust plenum 230 and used to measure the air pressure level therein. The cross-sectional area of the recovery passage 226 and the air pressure level within the exhaust plenum 230 may correspond to a particular flow rate of the recovery air 142 through the recovery passage 226. Accordingly, given the air pressure level within the exhaust plenum 230, a cross-sectional area of the recovery passage 226 may be selected to discharge the recovery air 142 a desired flow rate during operation of the HVAC system 102. Therefore, the recovery passage 226 may be configured to discharge the recovery air 142 from the exhaust plenum 230 at a previously determined flow rate without the use of a dedicated damper.

Figure 11:
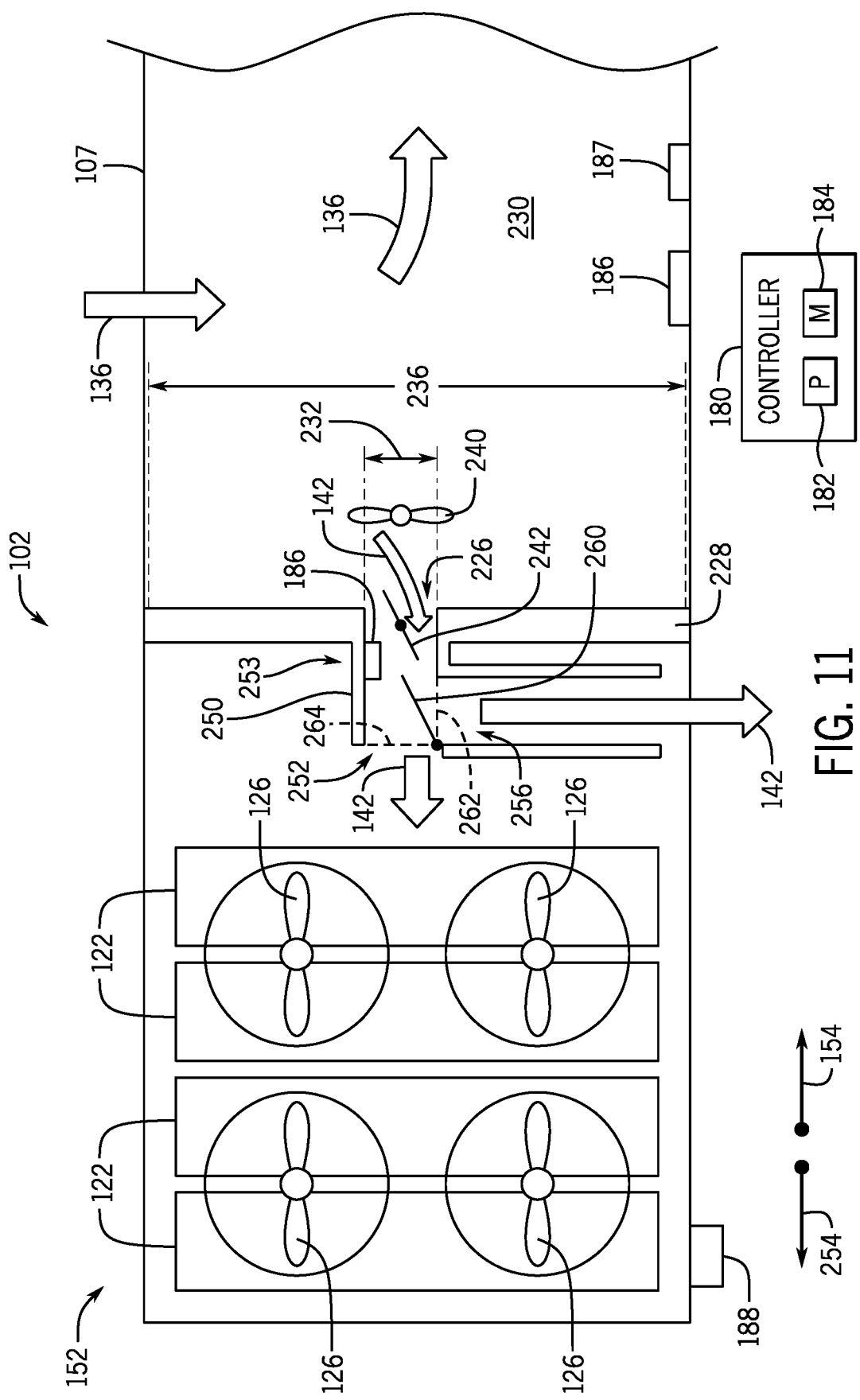
FIG. 11 is a schematic top view of an embodiment of the HVAC system of FIG. 10, in accordance with an aspect of the present disclosure.

The recovery passage 226 may extend along a height 231 and a width 232, as shown in FIG. 11, which may be adjusted to increase or decrease the cross-sectional area of the recovery passage 226. In some embodiments, the height 231 of the recovery passage 226 may be between about 1% and about 10% of a height 234 of the dividing panel 228, between about 10% and about 30% of the height 234 of the dividing panel 228, or more than 30% of the height 234 of the dividing panel 228. The width 232 of the recovery passage 226 may be between about 1% and about 10% of a width 236, as shown in FIG. 11, of the dividing panel 228, between about 10% and about 30% of the width 236 of the dividing panel 228, or more than 30% of the width 236 of the dividing panel 228. For example, in certain embodiments, the width 232 of the recovery passage 226 may extend along substantially all of the width 236 of the dividing panel 228. Accordingly, the recovery passage 226 may facilitate directing the recovery air 142 along a width of the condenser 122.

Although the recovery passage 226 is shown as a single passage in the illustrated embodiment of FIG. 9, it should be noted that the recovery passage 226 may include a plurality of individual passages formed in the dividing panel 228, in certain embodiments of the HVAC system 102. In some cases, the plurality of passages may additionally facilitate regulation of certain flow characteristics of the recovery air 142 discharging from the exhaust plenum 230. For example, a cross-sectional area of each of the passages, a geometric shape of each of the passages, a spacing between each of the passages, or any other suitable parameters of the plurality of passages may be selected to facilitate directing the recovery air 142 along a height 238 of the condenser 122. Accordingly, the plurality of passages may ensure that the recovery air 142 is distributed across the heat exchange area of the condenser 122.

In some embodiments, the plurality of passages may include circular openings or perforations that extend along the height 234 and the width 236 of the dividing panel 228. However, in other embodiments, the plurality of passages may be arranged and shaped in a honeycomb-like structure, a sponge-like structure, or any other suitable geometric arrangement to facilitate distribution of the recovery air 142 across the heat exchange area of the condenser 122. A total cross-sectional area of the plurality of passages may be selected to discharge a predetermined flow rate of the recovery air 142 from the exhaust plenum 230 during operation of the HVAC system 102. A magnitude of the total cross-sectional area of the plurality of passages may be determined with similar techniques to those used to determine the cross-sectional area of the recovery passage 226 discussed above. For clarity, the total cross-sectional of the plurality of passages is indicative of the summation of the individual cross-sectional areas of each passage of the plurality of passages.

In some embodiments, the exhaust plenum 230 includes a one or more flow generating devices, referred to herein as a passage fan 240, which are disposed adjacent to the recovery passage 226 and are configured to facilitate direction of the recovery air 142 through the recovery passage 226. The exhaust plenum 230 may additionally include a bypass damper 242 or a flow regulator, which is disposed within the recovery passage 226 and is configured to regulate a flow rate of the recovery air 142 in addition to, or in lieu of, the passage fan 240. It is important to note that the bypass damper 242 may include any suitable flow regulator or value configured to modulate a flow rate of the recovery air 142 through the recovery passage 226. In any case, the bypass damper 242 may transition between a first position, or an open position, and a second position, or a closed position. Accordingly, the bypass damper 242 may enable and/or disable a flow of the recovery air 142 through the recovery passage 226. The passage fan 240 and the bypass damper 242 may be communicatively coupled to the controller 180, which may be used to adjust a position of the bypass damper 242 and/or an operational speed of the passage fan 240 based on certain operational parameters of the HVAC system 102.

For example, as noted above, the HVAC system 102 may include the air quality sensors 187, which may provide the controller 180 with feedback indicative of a quality of air within the cooling load 104, a quality of air within the HVAC system 102, or both. Accordingly, the controller 180 may determine an actual air quality of the air flowing through the cooling load 104 and/or the HVAC system 102. The controller 180 may monitor the actual air quality throughout operation of the HVAC system 102 and compare the actual air quality to a predetermined target air quality, which may be stored in the memory device 184. If the actual air quality is below the target air quality by a threshold amount, the controller 180 may instruct the bypass damper 242 to transition to the open position and/or increase an operational speed of the passage fan 240. Accordingly, the controller 180 may increase a flow rate of air discharging as the recovery air 142, such that the HVAC system 102 may increase an intake amount of the fresh outdoor air 106 through the inlet duct 108 to generate supply air 112. Increasing an intake amount of the outdoor air 106 may thus enhance the air quality within the cooling load 104 and/or the HVAC system 102, such that the measured actual air quality approaches the desired target air quality.

If the actual air quality within the cooling load 104 and/or the HVAC system 102 is above the target air quality by a threshold amount, the controller 180 may transition the bypass damper 242 toward the closed position and/or decrease an operational speed of the passage fan 240. However, in other embodiments, the controller 180 may maintain a position of the bypass damper 242 and/or an operational speed of the passage fan 240 in response to determining that the actual air quality is at the target air quality or exceeds the target air quality. In any case, the controller 180 may actuate the bypass damper 242 and/or the passage fan 240 to ensure that the air quality within the cooling load 104 and/or the HVAC system 102 is maintained at or above the predetermined target air quality.

As discussed above, in some cases, a temperature of the ambient air 124 and/or a temperature of the outdoor air 106 may be less than a temperature of air within the cooling load 104 and/or a temperature of the exhaust air 136 during certain operational periods of the HVAC system 102. If the air quality within the cooling load 104 is below the target air quality, the controller 180 may instruct the bypass damper 242 and/or the passage fan 240 to discharge the recovery air 142 through the recovery passage 226. Unfortunately, because the temperature of the recovery air 142 is greater than a temperature of the ambient air 124 during such operational time periods, the recovery air 142 may decrease an operational efficiency of the HVAC system 102 when directed across the condenser 122.

Figure 10:
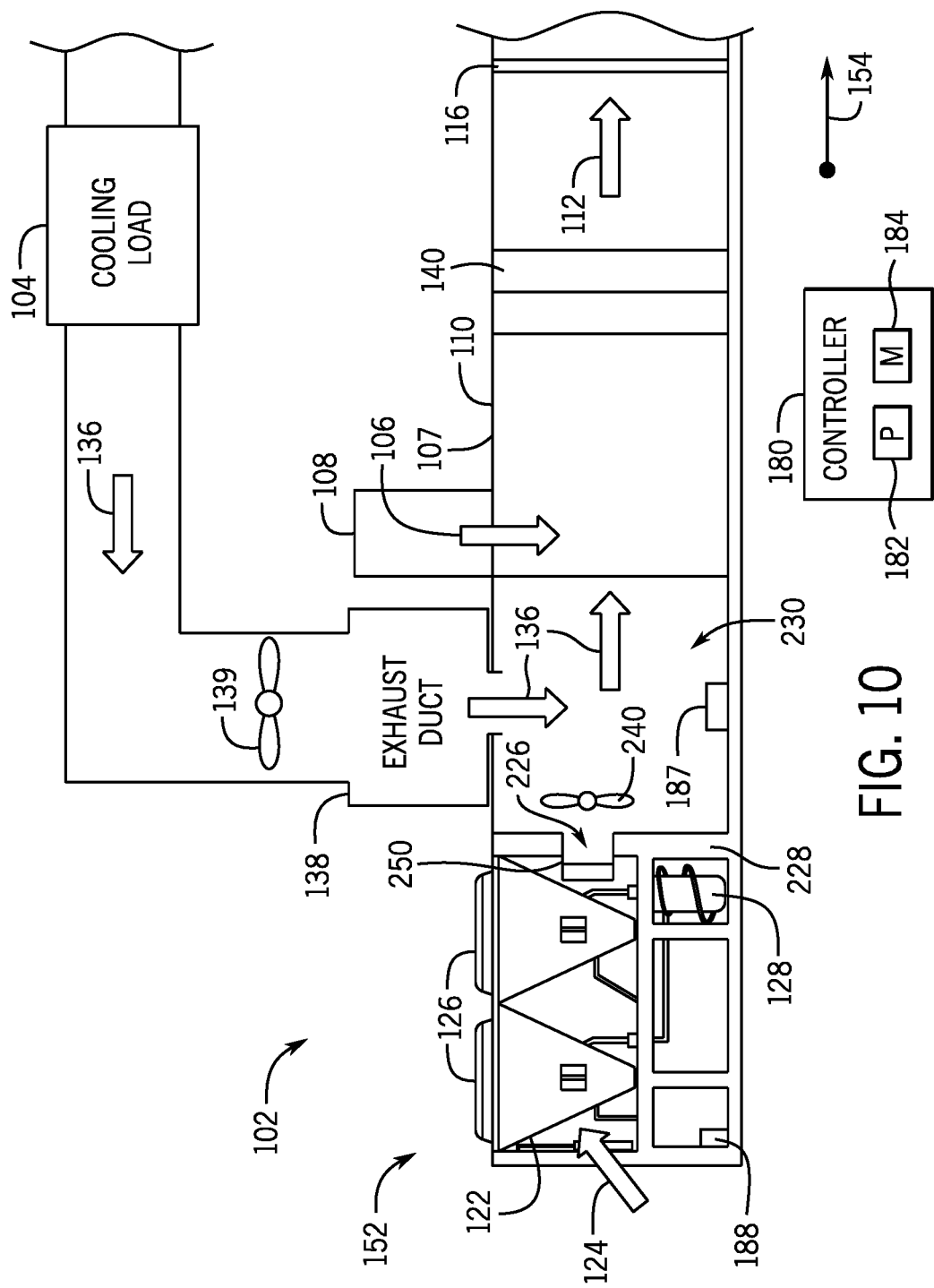
FIG. 10 is a schematic view of an embodiment of the HVAC system of FIG. 9, illustrating a diversion conduit coupled to the panel, in accordance with an aspect of the present disclosure.

With the forgoing in mind, FIG. 10 is a schematic diagram of an embodiment of the upstream end portion 152 of the HVAC system 102 including a diversion conduit 250, which may be coupled to the dividing panel 228 and may be used to divert the recovery air 142 away from the condenser 122 during operational periods of the HVAC system 102. For example, the diversion conduit 250 may redirect the recovery air 142 away from the condenser 122 when the recovery air 142 is warmer than the ambient air 124 and may direct the recovery air 142 toward the condenser 122 when the recovery air 142 is cooler than the ambient air 124. It should be noted that a length of the diversion conduit 250 may be significantly less than a length of the energy recovery conduit 100, because the diversion conduit 250 extends directly between the recovery passage 226 within the dividing panel 228 and the condenser 122. Accordingly, manufacturing costs and/or installation costs of the diversion conduit 250 may be less than manufacturing costs and/or installation costs of the energy recovery conduit 100. In addition, operation of the diversion conduit 250 may be achieved with a single damper, which may further reduce manufacturing costs, installation costs, and an operational complexity of the HVAC system 102.

Turning now to FIG. 11, a schematic diagram of a top view of the HVAC system 102 having the diversion conduit 250 is illustrated. As shown in the illustrated embodiment, the diversion conduit 250 includes a first outlet 252 that is directed substantially toward the condenser 122. For example, in some embodiments, the first outlet 252 may extend along a direction 254 that is generally parallel and opposite to the downstream direction 154. The diversion conduit 250 also includes a second outlet 256 that is oriented away from the condenser 122. For example, the second outlet 256 may be oriented in any direction that is not toward the condenser 122. For example, the second outlet 256 may be oriented in a direction generally perpendicular or crosswise to the direction 254. In certain embodiments, the diversion conduit 250 may be circumscribed by insulating material 253, such as fiberglass, aluminum foil, or cork, which may mitigate heat transfer between the recovery air 142 within the diversion conduit 250 and the ambient environment. However, because a length of the diversion conduit 250 is relatively short, an amount of heat transfer between the recovery air 142 within the diversion conduit 250 and the ambient environment may be negligible in certain embodiments of the HVAC system 102. Accordingly, the insulating material 253 may be omitted from the diversion conduit 250 in certain embodiments.

In the illustrated embodiment, the diversion conduit 250 includes a diversion damper 260 or flow regulator, which is communicatively coupled to the controller 180 and is configured to block or unblock the first and second outlets 252, 256. For example, the diversion damper 260 may move toward a first position 262, in which the diversion damper 260 blocks the second outlet 256 and unblocks the first outlet 252. Accordingly, recovery air 142 entering the diversion conduit 250 through the recovery passage 226 is discharged through the first outlet 252 toward the condenser 122, while airflow through the second outlet 256 is substantially blocked. The diversion damper 260 may also move to a second position 264, in which the diversion damper 260 blocks the first outlet 252 and unblocks the second outlet 256. Accordingly, the diversion conduit 250 directs the recovery air 142 through the second outlet 256 in a direction extending away from the condenser 122. The diversion damper 260 may thus hinder, or substantially eliminate, the flow of recovery air 142 across the condenser 122.

As described in greater detail herein, the controller 180 may instruct the diversion damper 260 to move between the first position 262 and the second position 264, or any position therebetween, based on a temperature of the ambient air 124, a temperature of the exhaust air 136, and/or a temperature of the recovery air 142. For example, the controller 180 may receive feedback from the ambient air temperature sensor 188 and the recovery air temperature sensor 186 indicative of a temperature of the ambient air 124 and a temperature of the recovery air 142, respectively. It should be noted that the recovery air temperature sensor(s) 186 may be disposed within the recovery passage 226, the diversion conduit 250, the exhaust plenum 230, or a combination thereof. If the controller 180 determines that a temperature of the ambient air 124 is greater than a temperature of the recovery air 142, the controller 180 may instruct the diversion damper 260 to move to the first position 262, such that the recovery air 142 is discharged through the first outlet 252 and toward the condenser 122. Conversely, if the controller 180 determines that the temperature of the ambient air 124 is less than the temperature of the recovery air 142, the controller 180 may instruct the diversion damper 260 to move to the second position 264, and thus, direct the recovery air 142 through the second outlet 256 in a direction extending away from the condenser 122.

The controller 180 may additionally regulate a flow rate of the recovery air 142 through the first outlet 252 or the second outlet 256 by transitioning the bypass damper 242 between a respective open position and a respective closed position. For example, the controller 180 may increase a flow rate of the recovery air 142 through the first outlet 252 and/or the second outlet 256 by transitioning the bypass damper 242 toward the open position, and may decrease a flow rate of the recovery air 142 through the first outlet 252 and/or the second outlet 256 by transitioning the bypass damper 242 toward the closed position. In some embodiments, the recovery air 142 may be between about 20% and about 90%, between about 40% and about 70%, or about 50% of the input air flow across the condenser 122 when the bypass damper 242 is disposed in the open position. Conversely, the input air flow may include substantially none of the recovery air 142 when the bypass damper 242 is disposed in the closed position. That is, when the bypass damper 242 is closed, a majority of the input air flow, or substantially all of the input air flow, includes the ambient air 124. However, as noted above, the bypass damper 242 may be omitted from the recovery passage 226 in certain embodiments of the HVAC system 102. In such embodiments, a portion of the exhaust air 136 may continuously flow into the diversion conduit 250 during operation of the HVAC system 102 and discharge through the first outlet 252 and/or the second outlet 256. That is, a portion of the input air flow may continuously include the recovery air 142.

Figure 12:
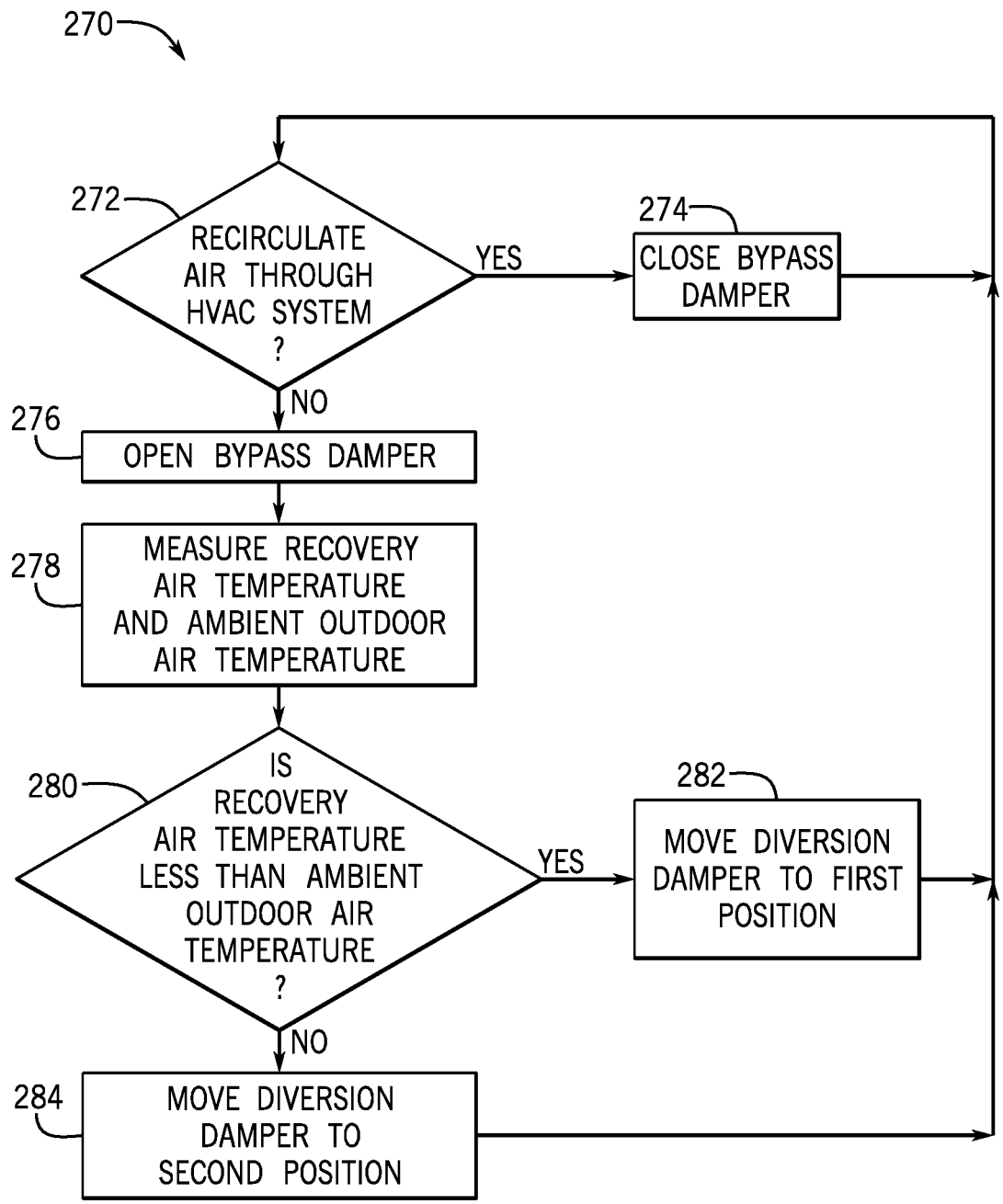
FIG. 12 is an embodiment of a method of operating the diversion conduit of FIGS. 10 and 11, in accordance with an aspect of the present disclosure.

With the foregoing in mind, FIG. 12 is an embodiment of a method 270 of operating the energy recovery system having the recovery passage 226 and the diversion conduit 250, in lieu of the energy recovery conduit 100. The method 270 may begin with determining an amount of exhaust air 136 to be recirculated through the HVAC system 102, as indicated by decision block 272. For example, the controller 180 may measure an air quality of the exhaust air 136 using the air quality sensors 187 or any other suitable sensors of the HVAC system 102, and determine whether the air quality is above or below a predetermined target value. It should be noted that the air quality may include any suitable air characteristic including, but not limited to, oxygen saturation, carbon dioxide saturation, smoke level, pollen level, or any other air quality parameter or characteristic. Accordingly, it is important to note that an elevated carbon dioxide saturation, an elevated smoke level, and/or an elevated pollen level may be indicative of a reduced air quality, while an elevated oxygen level may be indicative of an enhanced air quality. Moreover, in certain embodiments, the air characteristics may also include a temperature of the supply air 112, a temperature of the exhaust air 136, and/or a temperature of the recovery air 142.

In any case, if the air quality of the exhaust air 136 is exceeds the target value by a threshold amount, the controller 180 may instruct the bypass damper 242 to close, or partially close, as indicated by process block 274. Accordingly, a substantial portion of the exhaust air 136 may be recirculated through the HVAC system 102. Conversely, if the measured air quality of the exhaust air 136 is below the target value by the threshold amount, the controller 180 may instruct the bypass damper 242 to open, or partially open, as indicated by process block 276. As such, the exhaust air 136 may be discharged from the central housing 107 of the HVAC system 102 as recovery air 142, while outdoor air 106 from the ambient environment may be directed into the HVAC system 102 through the inlet duct 108.

The controller 180 is also configured to detect a temperature of the recovery air 142 and/or a temperature of the exhaust air 136 using the recovery air temperature sensor 186 and detect a temperature of the ambient air 124 using the ambient air temperature sensor 188, as indicated by process block 278. The controller 180 may determine, as indicated by decision block 280, if the temperature of the recovery air 142 is less than the temperature of the ambient air 124. If the temperature of the recovery air 142 is less than the temperature of the ambient air 124, the controller 180 may instruct the diversion damper 260 to move to the first position 262, as indicated by process block 282. As discussed above, the recovery air 142 may thus flow across the condenser 122, thereby decreasing a saturation temperature of the condenser 122 and increasing an energy efficiency of the HVAC system 102.

Conversely, if the temperature of the recovery air 142 is greater than the temperature of the ambient air 124, the controller 180 may instruct the diversion damper 260 to move to the second position 264, as indicated by process block 284. Accordingly, the recovery air 142 may discharge from the diversion conduit 250 without flowing across the condenser 122. In some embodiments, the controller 180 may thus maintain a threshold quality of air circulating through the HVAC system 102, while simultaneously determining whether to direct the recovery air 142 across the condenser 122 or enable the recovery air 142 to bypass the condenser 122 and discharge directly into the ambient environment. Advantageously, the diversion conduit 250 may enable the controller 180 to maintain the threshold quality of air within the HVAC system 102 and direct the recovery air 142 toward or away from the condenser 122 using two dampers, such as the bypass damper 242 and the diversion damper 260, which may decrease assembly, maintenance, and/or installation costs of the energy recovery system. As noted above, the diversion conduit 250 may be omitted from the energy recovery system in certain embodiments of the HVAC system 102, such that the energy recovery system includes and is operable using a single damper, such as the bypass damper 242, or without the use of any dedicated damper.

Technical effects of the energy recovery system include improved efficiency of the HVAC system 102 by directing exhaust air 136 from the cooling load 104 directly across a heat exchange area of the condenser 122 as recovery air 142. Accordingly, the recovery air 142 may lower a saturation temperature of the condenser 122, which may thus improve an efficiency of the HVAC system 102. The recovery passage 226 and the diversion conduit 250 may cooperate to reduce a quantity of dampers within the energy recovery system, as well as an overall size of the energy recovery system. This may reduce manufacturing costs, assembly costs, and maintenance costs associated with operating the energy recovery system. Reducing a quantity of dampers within the energy recovery system may additionally reduce an amount of control features used to operate the energy recovery system, which may further facilitate assembly, maintenance, and/or installation time of the energy recovery system.

As discussed above, the aforementioned embodiments of the energy recovery system may be used on the HVAC unit 12, the residential heating and cooling system 50, the HVAC system 102, a rooftop unit, or in any other suitable HVAC system. Additionally, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A heating, ventilation, and/or air conditioning (HVAC) system, comprising:
    an exhaust plenum of an enclosure of the HVAC system, wherein the exhaust plenum is configured to receive an exhaust air flow from a cooling load;
    a condenser positioned external to the enclosure and configured to receive an input air flow and transfer thermal energy from a refrigerant to the input air flow; and
    a panel positioned directly adjacent to and between the exhaust plenum and the condenser, wherein the panel comprises a passage providing a fluid flow path extending from the exhaust plenum to the condenser, wherein the passage is configured to discharge a portion of the exhaust air flow, and the input air flow comprises the portion.

2. The HVAC system of claim 1, comprising a flow regulator disposed within the passage, wherein the flow regulator is configured to modulate a flow rate of the portion of the exhaust air flow through the passage.

3. The HVAC system of claim 1, comprising a conduit coupled to the panel, wherein the conduit extends between the passage and an external environment surrounding the exhaust plenum.

4. The HVAC system of claim 3, comprising a flow regulator coupled to the conduit, wherein the flow regulator is configured to direct the portion of the exhaust air flow from the exhaust plenum to the condenser when the flow regulator is in a first position, and wherein the flow regulator is configured to direct the portion of the exhaust air flow from the exhaust plenum to the external environment when the flow regulator is in a second position.

5. The HVAC system of claim 4, further comprising:
    a first sensor disposed within the exhaust plenum, wherein the first sensor is configured to measure a first temperature of the exhaust air flow;
    a second sensor disposed external to the exhaust plenum, wherein the second sensor is configured to measure a second temperature of ambient atmospheric air; and
    a controller communicatively coupled to the first sensor, the second sensor, and the flow regulator, wherein the controller is configured to compare a first value associated with the first temperature and a second value associated with the second temperature, and wherein the controller is configured to instruct the flow regulator to transition toward the first position when the first value is less than the second value.

6. The HVAC system of claim 5, wherein the controller is configured to instruct the flow regulator to transition toward the second position when the first value is greater than the second value.

7. The HVAC system of claim 1, comprising an economizer adjacent the exhaust plenum, wherein the economizer is configured to receive outdoor air and a remaining portion of the exhaust air flow, and the economizer is configured to discharge a mixture of the outdoor air and the remaining portion of the exhaust air flow as supply air.

8. The HVAC system of claim 7, further comprising:
    a sensor disposed within the exhaust plenum and configured to provide feedback indicative of an air quality of the exhaust air flow;
    a flow regulator disposed within the passage and configured to move between a first position and a second position, wherein the flow regulator is configured to enable discharge of the portion of the exhaust air flow through the passage in the first position and block discharge of the portion of the exhaust air flow in the second position; and
    a controller communicatively coupled to the sensor and the flow regulator, wherein the controller is configured to transition the flow regulator toward the first position when the feedback indicative of the air quality is below a target air quality.

9. The HVAC system of claim 8, wherein the controller is configured to transition the flow regulator toward the second position when the feedback indicative of the air quality exceeds the target air quality.

10. The HVAC system of claim 1, comprising:
    a controller communicatively coupled to a flow generating device disposed adjacent to the passage; and
    a sensor, wherein the sensor is configured to measure an air quality of the exhaust air flow, and wherein the controller is configured to increase an operational speed of the flow generating device when the air quality is below a target air quality to increase a flow rate of the portion of the exhaust air flow traversing the passage.

11. The HVAC system of claim 1, wherein the condenser is fluidly coupled to a refrigerant loop comprising an evaporator, an expansion value, and a compressor, and wherein the condenser is configured to receive a flow of the refrigerant from the refrigerant loop.

12. The HVAC system of claim 1, comprising the enclosure, wherein the enclosure defines a portion of a supply air flow path of the HVAC system, wherein the portion of the supply air flow path is configured to guide a supply air flow through an interior of the enclosure and toward the cooling load, and wherein the condenser is separate from the supply air flow path.

13. The HVAC system of claim 12, wherein the cooling load comprises a building serviced by the HVAC system.

14. The HVAC system of claim 12, wherein the supply air flow comprises a remaining portion of the exhaust air flow different from the portion of the exhaust air flow.

15. The HVAC system of claim 1, comprising an evaporator positioned within the enclosure, wherein the evaporator is configured to receive a remaining portion of the exhaust air flow and to condition the remaining portion of the exhaust air flow.

16. A heating, ventilation, and/or air conditioning (HVAC) system, comprising an exhaust plenum of an enclosure of the HVAC system and a condenser separated by a panel disposed directly adjacent to and between the exhaust plenum and the condenser, wherein the condenser is positioned external to the enclosure, and wherein the panel comprises a passage providing a fluid flow path extending from the exhaust plenum to the condenser and configured to direct an exhaust air flow from the exhaust plenum to the condenser, and comprising a controller, wherein the controller is configured to:
  receive, via a sensor, a signal indicative of an air characteristic of the exhaust air flow;
  compare a value associated with the signal with a target air characteristic value; and
  instruct a flow regulator to move toward an open position when the value associated with the signal is less than the target air characteristic value, wherein the flow regulator is configured to modulate a flow rate of the exhaust air flow through the passage.

17. The HVAC system of claim 16, wherein the controller is configured to move the flow regulator toward a closed position when the value associated with the signal is above the target air characteristic value.

18. The HVAC system of claim 16, wherein the sensor is a first sensor, and wherein the controller is further configured to:
  receive, via a second sensor, a signal indicative of a first temperature of the exhaust air flow;
  receive, via a third sensor, a signal indicative of a second temperature of ambient atmospheric air;
  compare a value associated with the first temperature and a value associated with the second temperature; and
  instruct an additional flow regulator to move to a first position when the value associated with the first temperature is less than the value associated with the second temperature, wherein the additional flow regulator is configured to direct the exhaust air flow across the condenser in the first position.

19. The HVAC system of claim 18, wherein the controller is configured to instruct the additional flow regulator to move toward a second position when the value associated with the first temperature is greater than the value associated with the second temperature, wherein the additional flow regulator is configured direct the exhaust air flow into an ambient environment in the second position.

20. The HVAC system of claim 16, wherein the condenser is fluidly coupled to a compressor and is configured to receive a refrigerant from the compressor to facilitate heat transfer between the refrigerant and an air flow directed across the condenser.

21. A heating, ventilation, and/or air conditioning (HVAC) system, comprising:
  a condenser configured to receive an input air flow and transfer thermal energy from a refrigerant to the input air flow;
  an exhaust plenum disposed adjacent to the condenser and configured to receive an exhaust air flow, wherein the exhaust plenum defines a portion of a supply air flow path of the HVAC system configured to guide supply air toward a cooling load serviced by the HVAC system, and wherein the condenser is separate from the supply air flow path;
  a panel positioned directly adjacent to and between the condenser and the exhaust plenum, wherein the panel comprises a passage formed therein;
  a conduit coupled to the panel and in fluid communication with the passage, wherein the conduit comprises a first outlet oriented toward the condenser and a second outlet oriented away from the condenser, wherein the passage, the conduit, and the first outlet form an additional flow path extending from the exhaust plenum to the condenser; and
  a flow regulator disposed within the conduit and configured to transition between a first position and a second position, wherein the flow regulator is configured to occlude the first outlet in the first position and occlude the second outlet in the second position.

22. The HVAC system of claim 21, further comprising:
  a first sensor configured to generate a first signal indicative of a first temperature of the exhaust air flow;
  a second sensor configured to generate a second signal indicative of a second temperature of ambient atmospheric air; and
  a controller configured to receive the first signal and the second signal, wherein the controller is configured to actuate the flow regulator toward the first position in response to the first temperature being greater than the second temperature, and wherein the controller is configured to actuate the flow regulator toward the second position in response to the first temperature being less than the second temperature.

23. The HVAC system of claim 22, comprising an additional flow regulator disposed within the passage, wherein the additional flow regulator is configured to transition between an open position and a closed position to selectively unblock and block the additional flow path through the passage.

24. The HVAC system of claim 23, wherein the controller is configured to monitor an air quality of the exhaust air flow via feedback from an air quality sensor, and wherein the controller is configured to actuate the additional flow regulator to the open position when the air quality is below a target air quality.

25. The HVAC system of claim 21, wherein the first outlet is aligned in a cross-wise orientation relative to a width of the panel, and wherein the second outlet is aligned in an orientation along the width of the panel.

26. The HVAC system of claim 21, wherein the exhaust plenum is configured to guide a first portion of the exhaust air flow along the supply air flow path and toward the cooling load, and wherein the conduit is configured to guide a second portion of the exhaust air flow toward the condenser such that the input air flow comprises the second portion of the exhaust air flow.

* * * * *